(12) United States Patent
Minaki et al.

(10) Patent No.: US 10,530,245 B2
(45) Date of Patent: Jan. 7, 2020

(54) ELECTRIC POWER STEERING APPARATUS

(71) Applicant: NSK LTD., Tokyo (JP)

(72) Inventors: Ryo Minaki, Tokyo (JP); Hiroaki Takase, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/312,682

(22) PCT Filed: Jul. 18, 2017

(86) PCT No.: PCT/JP2017/025916
§ 371 (c)(1),
(2) Date: Dec. 21, 2018

(87) PCT Pub. No.: WO2018/016476
PCT Pub. Date: Jan. 25, 2018

(65) Prior Publication Data
US 2019/0252972 A1 Aug. 15, 2019

(30) Foreign Application Priority Data

Jul. 20, 2016 (JP) .................................. 2016-142622
Jul. 20, 2016 (JP) .................................. 2016-142626

(51) Int. Cl.
*H02P 21/00* (2016.01)
*H02M 1/38* (2007.01)
(Continued)

(52) U.S. Cl.
CPC .............. *H02M 1/38* (2013.01); *B62D 5/046* (2013.01); *B62D 5/0463* (2013.01); *B62D 6/00* (2013.01);
(Continued)

(58) Field of Classification Search
CPC .......... H02P 21/05; H02P 21/22; H02P 21/14; H02M 7/53871
See application file for complete search history.

(56) References Cited

U.S. PATENT DOCUMENTS

2007/0029959 A1 2/2007 Ta et al.
2007/0090782 A1 4/2007 Endo et al.
(Continued)

FOREIGN PATENT DOCUMENTS

JP 5-122970 A 5/1993
JP 2002-325499 A 11/2002
(Continued)

OTHER PUBLICATIONS

International Search Report for PCT/JP2017/025916 dated Oct. 24, 2017 (PCT/ISA/210).
(Continued)

*Primary Examiner* — Karen Masih
(74) *Attorney, Agent, or Firm* — Sughrue Mion, PLLC

(57) ABSTRACT

[Problem]
An object of the present invention is to provide an electric power steering apparatus of a vector control system that compensates a dead time of an inverter, a motor back-EMF and an interference voltage due to a mutual inductance between motor windings, improves a distortion of a current waveform and a responsibility of a current control, and suppresses a noise, vibration and a ripple.
[Means for Solving the Problem]
The present invention is the electric power steering apparatus that driving-controls a 3-phase brushless motor which applies an assist torque to a steering mechanism of a vehicle by using a current command value calculated based on at least a steering torque, and vector-controls the 3-phase brushless motor, via an inverter, by converting dq-axes command values converted from the current command value into 3-phase values, comprising a dq-axes disturbance observer to compensate respective axes disturbance voltages, which include a dead time of the inverter, for the dq-axes command values, or comprising: a dq-axes disturbance observer to compensate respective axes disturbance (Continued)

voltages, which include a dead time of the inverter, for the dq-axes command values and a spatial vector modulating section.

12 Claims, 18 Drawing Sheets

(51) Int. Cl.
| | |
|---|---|
| *H02M 7/48* | (2007.01) |
| *H02P 6/10* | (2006.01) |
| *H02P 21/05* | (2006.01) |
| *H02P 21/13* | (2006.01) |
| *B62D 5/04* | (2006.01) |
| *H02P 21/22* | (2016.01) |
| *B62D 6/00* | (2006.01) |
| *H02M 7/5387* | (2007.01) |
| *H02P 21/14* | (2016.01) |
| *H02P 27/08* | (2006.01) |

(52) U.S. Cl.
CPC ......... *H02M 7/48* (2013.01); *H02M 7/53871* (2013.01); *H02P 6/10* (2013.01); *H02P 21/05* (2013.01); *H02P 21/13* (2013.01); *H02P 21/14* (2013.01); *H02P 21/22* (2016.02); *H02P 27/08* (2013.01); *H02M 2001/385* (2013.01)

(56) References Cited

U.S. PATENT DOCUMENTS

| | | |
|---|---|---|
| 2012/0139461 A1 | 6/2012 | Suzuki et al. |
| 2019/0161116 A1* | 5/2019 | Moreillon .............. B62D 1/286 |

FOREIGN PATENT DOCUMENTS

| | | |
|---|---|---|
| JP | 2005-160221 A | 6/2005 |
| JP | 3706296 B2 | 10/2005 |
| JP | 2006-166628 A | 6/2006 |
| JP | 2007-252163 A | 9/2007 |
| JP | 2010-041867 A | 2/2010 |
| JP | 4681453 B2 | 5/2011 |
| JP | 2015-171251 A | 9/2015 |
| JP | 2016-054594 A | 4/2016 |

OTHER PUBLICATIONS

International Preliminary Report on Patentability for PCT/JP2017/025916 dated Jan. 31, 2018.

* cited by examiner

PRIOR ART

PRIOR ART

FIG.26C IDEAL VOLTAGE VECTOR

FIG.26D ACTUAL VOLTAGE VECTOR (BEFORE CORRECTION)

FIG.26E ACTUAL VOLTAGE VECTOR (AFTER CORRECTION)

ized-ON. In order to prevent the direct current link from being shorted, a dead time, which is a time that the switching devices of both arms are turned-OFF, is provided.

ELECTRIC POWER STEERING APPARATUS

CROSS REFERENCE TO RELATED APPLICATIONS

This application is a National Stage of International Application No. PCT/JP2017/025916 filed Jul. 18, 2017, claiming priority based on Japanese Patent Application No. 2016-142622, filed Jul. 20, 2016 and Japanese Patent Application No. 2016-14262 filed Jul. 20, 2016.

TECHNICAL FIELD

The present invention relates to an electric power steering apparatus that enables to smoothly assist-control by vector-controlling a drive of a 3-phase brushless motor by using a dq-axes rotational coordinate system, and by compensating a disturbance such as a dead time of an inverter, aback electromotive force (a back-EMF) of the motor and an interference voltage due to a mutual inductance between windings, and in particular to the high-performance electric power steering apparatus that improves a distortion of a current waveform and a responsibility of a current control, and suppresses a noise, vibration, and a ripple by using a dq-axes disturbance observer and a spatial vector modulating section that are interposed in the dq-axes.

BACKGROUND ART

An electric power steering apparatus (EPS) which provides a steering mechanism of a vehicle with a steering assist torque (an assist torque) by means of a rotational torque of a motor, applies a driving force of the motor as an actuator to a steering shaft or a rack shaft by means of a transmission mechanism such as gears or a belt through a reduction mechanism. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor by means of a voltage control command value Vref obtained by performing a compensation or the like to the calculated current command value. A steering angle sensor 14 is not indispensable and may not be provided. It is possible to obtain the steering angle (a motor rotational angle) θ from a rotational position sensor such as a resolver which is connected to the motor 20.

A controller area network (CAN) 40 to send/receive various information and signals on the vehicle is connected to the control unit 30, and it is also possible to receive the vehicle speed Vs from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU) and a micro controller unit (MCU)), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a current command value calculating section 31. The current command value calculating section 31 calculates a current command value Iref1 based on the steering torque Th and the vehicle speed Vs using an assist map or the like. The calculated current command value Iref1 is added with a compensation signal CM for improving characteristics from a compensating section 34 at an adding section 32A. The current command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

The subtracted result ΔI (=Irefm−Im) at the subtracting section 32B is current-controlled such as a proportional-integral (PI) at a PI-control section 35. The voltage control value Vref obtained by the current-control and a modulation signal (a triangle wave carrier) CF are inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feed-back.

The compensating section 34 adds a self-aligning torque (SAT) detected or estimated and an inertia compensation value 342 at an adding section 344. The added result is further added with a convergence control value 341 at an adding section 345. The added result is inputted into the adding section 32A as the compensation signal CM, thereby to improve the control characteristics.

Recently, a 3-phase brushless motor is mainly used as an actuator of the electric power steering apparatus, and since the electric power steering apparatus is on-vehicle products, the operating temperature range is wide. From a view point of a fail-safe, a dead time of the inverter to drive the motor needs greater than that for general industrial purposes that home appliances ("industrial equipment"<"EPS"). Generally, since a switching device (for example, a field-effect transistor (FET)) has a delay time when it is turned-OFF, a direct current link is shorted when the switching devices of an upper-arm and a lower-arm are simultaneously turned- ON or turned-OFF. In order to prevent the above problem, a time (a dead time) that the switching devices of both arms are turned-OFF, is set.

As a result, a current waveform is distorted, and a responsibility of the current control and a steering feeling go down. For example, in a state that the handle is near on-center of the steering, a discontinuous steering feeling and the like due to the torque ripple are occurred. Since the back-EMF voltage of the motor in a while speed steering or a high speed steering, and the interference voltage between the windings operate as the disturbance against the current control, a steering follow-up performance and the steering feeling in turn-back steering are badly affected.

A q-axis to control the torque being the coordinate axis of a rotor of the 3-phase brushless motor and a d-axis to control the magnetic field strength are independently set and has a relation that the d-axis and the q-axis is 90°. Thus, a vector control system to control the currents (the d-axis current command value and the q-axis current command value) corresponding to respective axes with the vector, is known.

FIG. 3 shows a configuration example in a case that a 3-phase brushless motor 100 is driving-controlled by the vector control system. A d-axis current command value $i_d^*$ and a q-axis current command value $i_q^*$, which are calculated at the current command value calculating section (not shown) based on the steering torque Th, the vehicle speed Vs and so on, of a dq-axis coordinate system of two axes are respectively inputted into subtracting sections 131d and 131q, and current deviations $\Delta i_d^*$ and $\mathrm{D} i_q^*$ obtained at the subtracting sections 131d and 131q are respectively inputted into PI-control sections 120d and 120q. Voltage command values $v_d$ and $v_q$ PI-controlled at the PI-control sections 120d and 120q are respectively inputted into a subtracting section 121d and an adding section 121q, and command voltages $\Delta v_d$ and $\Delta v_q$ obtained at the subtracting section 121d and the adding section 121q are inputted into a 2-phase/3-phase converting section 150. Voltage command values $V_u^*$, $V_v^*$ and $V_w^*$ converted into 3-phases at the 2-phase/3-phase converting section 150 are inputted into a PWM-control section 160, and the motor 100 is driven by using the calculated 3-phase duties via the inverter 161.

3-phase motor currents of the motor 100 are detected by current detectors 162, and the detected 3-phase motor currents $i_u$, $i_v$ and $i_w$ are inputted into the 3-phase/2-phase converting section 130. The 2-phase feed-back current $i_d$ and $i_q$ that are converted at the 3-phase/2-phase converting section 130 are respectively subtraction-inputted into subtracting sections 131d and 131q, and further inputted into a d-q non-interference control section 140. A rotational sensor or the like is attached to the motor 100, and a motor rotational angle θ and a motor rotational number (velocity) co are outputted from an angle detecting section 110 to process the sensor signal. The motor rotational angle θ is inputted into the 2-phase/3-phase converting section 150 and the 3-phase/2-phase converting section 130, and the motor rotational number co is inputted into the d-q non-interference control section 140.

The electric power steering apparatus of the vector control system described above is an apparatus to assist a steering of a driver, and also a sound and a vibration of the motor, a torque ripple and the like are transmitted to the driver as a force sense via the handle. In order that the upper-arm FET and the lower-arm FET are not short-circuited, the inverter has a dead time. Since the dead time is nonlinear, the current waveform is distorted, the responsibility of the control is badly affected and the sound, the vibration and the torque ripple are generated. In a column type electric power steering apparatus, since an arrangement of the motor directly connected to a gear box which is connected by the handle and the column shaft made of steel is extremely near the driver in the mechanism, it is necessary to especially consider the sound, the vibration, the torque ripple and the like due to the motor in comparison with a downstream type electric power steering apparatus.

FIG. 4 shows a result in a case that sinusoidal wave is inputted into the d-axis current command value (a reference value) in the general dq-axes vector control (FIG. 3). It is understood that the waveform of the current measuring value is distorted to the d-axis current command value. Showing the motor current when the handle is slowly steered from the straight running state (the on-center state), as shown in FIG. 5 and FIG. 6, it is understood that the vibration and the ripple of the q-axis current (the torque) are large due to the distortion of the phase currents. FIG. 5 shows the U-phase motor current to the W-phase motor current for the d-axis current command value and the q-axis current command value. FIG. 6 shows only the q-axis current command value and the U-phase motor current from FIG. 5.

Conventionally, as a method to compensate the dead time of the inverter, there are methods to add the compensation value to the dead time by detecting a timing occurring the dead time and to compensate the dead time by a disturbance observer on the dq-axes in the current control.

In the control unit of the electric power steering apparatus shown in Japanese Patent No. 3706296 B2 (Patent Document 1), the disturbance voltage estimating observer, which measures the disturbance voltage generated in the motor by using the voltage applied to the motor and the present current value of the motor and outputs a signal corresponding to the disturbance voltage, is disposed, and the dead time of the inverter is compensated. In the control unit of the voltage type inverter shown in Japanese Unexamined Patent Publication No. 2007-252163 A (Patent Document 2), the disturbance estimating observer, which estimates the disturbance voltage including an output voltage error which is caused by the dead time of the inverter and an back-EMF electric power component of the motor, is disposed, and the dead time of the inverter is compensated.

THE LIST OF PRIOR ART DOCUMENTS

Patent Documents

Patent Document 1: Japanese Patent No. 3706296 B2
Patent Document 2: Japanese Unexamined Patent Publication No. 2007-252163 A
Patent Document 3: Japanese Patent No. 4681453 B2
Patent Document 4: Japanese Unexamined Patent Publication No. 2015-171251 A

SUMMARY OF THE INVENTION

Problems to be Solved by the Invention

However, the control unit of Patent Document 1 compensates only the dead time of the inverter by the disturbance voltage estimating observer. Because the current controller is further disposed, the configuration is complicate. Since a high pass filter (HPF) is disposed depending on the embodiments, the problem of the deterioration of the characteristic is existed. The disturbance estimating observer in the control unit of the Patent Document 2 compensates only the dead time of the inverter. The motor back-EMF is compensated by a logic that is different from that of the disturbance estimating observer. Thus, the sufficient control performance is not expected only by interposing the disturbance estimating observer. Further, the disturbance estimating observer on the dq-axes estimates the dead time as the voltage disturbance. Since the third-order component of the signal is removed in the 2-phase/3-phase coordinate conversation, there is a problem that the effect is not adequate. In the control units of Patent Documents 1 and 2, since an inductance variation in a magnetic saturation region of the motor is not compensated, the problem that the current waveform is distorted is existed.

Because the back-EMF of the motor is largely affected, and the timing that the dead time generates is deviated near a zero-cross point in the electric power steering apparatus, the effect of the dead time compensation in cases of Patent Documents 1 and 2, is not sufficient. Since the compensation accuracy is determined by the back-EMF estimation-logic in compensating the motor back-EMF, the performance such as the steering follow-up is inadequate in the region that the estimating error is large. The motor back-EMF is non-linear, the non-linear component is enlarge due to a manufacturing variation of the motor, a temperature variation of the motor itself, the region that the rotational speed of the motor is the while speed or the high speed. It is extremely difficult to calculate the accurate compensation value of the back-EMF, which compensates the rotational speed and the like by using a linear operation equation.

In addition, the electric power steering apparatus to compensate the dead time is disclosed in, for example, Japanese Patent No. 4681453 B2 (Patent Document 3) and Japanese Unexamined Patent Publication No. 2015-171251 A (Patent Document 4). In Patent Document 3, there is provided a dead band compensation circuit that generates a model current based on the current command values by inputting the current command values into a reference model circuit of the current control loop including the motor and the inverter, and compensates the influence of the dead time of the inverter based on the model current. Since the apparatus of Patent Document 3 compensates only the dead time, does not consider the disturbance compensation and changes the compensation amount depending on the current command value, there is a problem that the distortion of the current and the like is largely affected to the compensation amount. Further, in Patent Document 4, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value. Since the apparatus of Patent Document 4 compensates only the dead time, does not consider the disturbance compensation, performs the compensation to the 3-phase duty command values and changes the compensation amount depending on the current command value, there is a problem that the distortion of the current and the like is largely affected to the compensation amount.

Generally, in a case that the motor is driven in the low speed and the low load, the dead times are simultaneously generated in the plural phases. Since the case that the output voltage vectors are different depending on the phases is existed, the dead time compensation is very difficult. Further, there is also a problem that the compensation value error is larger due to the sign detection error of the current.

The present invention has been developed in view of the above-described circumstances, and an object of the present invention is to provide the electric power steering apparatus of the vector control system that compensates the dead time of the inverter, the motor back-EMF and the interference voltage due to the mutual inductance between the motor windings, improves the distortion of the current waveform and the responsibility of the current control, and suppresses the noise, the vibration and the ripple. The electric power steering apparatus comprises the dq-axes disturbance observer to compensate the disturbance of the dq-axes paths, and a spatial vector modulating section to convert the 2-phase voltage command values into the 3-phase values, superimpose the third harmonic and perform the dead time compensation in the current control path of the vector control.

Means for Solving the Problems

The present invention relates to an electric power steering apparatus that driving-controls a 3-phase brushless motor which applies an assist torque to a steering mechanism of a vehicle by using a current command value calculated based on at least a steering torque, and vector-controls the 3-phase brushless motor, via an inverter, by converting dq-axes command values converted from the current command value into 3-phase values, the above-described object of the present invention is achieved by that comprising: a dq-axes disturbance observer to compensate respective axes disturbance voltages, which include a dead time of the inverter, for the dq-axes command values.

The above-described object of the present invention is efficiently achieved by that: wherein the dq-axes disturbance observer comprises axes observer sections that each of a d-axis and a q-axis includes a motor model, an inverse motor model and a low pass filter; or wherein each of the axes observer sections comprises a first subtracting section to subtract an axis disturbance estimation voltage from an axis voltage, the motor model to input an axis voltage command value that adds an axis disturbance element to a voltage deviation from the first subtracting section, and output an axis current, the inverse motor model to input the axis current, the low pass filter to input the voltage deviation, and a second subtracting section to subtract an output of the low pass filter from an output of the inverse motor model, and output the axis disturbance estimation voltage; or wherein a compensation value of the dq-axes disturbance observer is changeable depending on a power supply voltage of the inverter; or wherein an inductance nominal value of the dq-axes disturbance observer is changeable, sensitive to currents of the 3-phase brushless motor; or wherein a first spatial vector modulating section to superimpose a third harmonic is disposed at a subsequent stage of the dq-axes disturbance observer; or wherein a second spatial vector modulating section to input 3-phase motor currents of the 3-phase brushless motor, convert compensated dq-axes voltage command values from the dq-axes disturbance observer into 3-phase values, superimpose a third harmonic and compensate a dead time of the inverter, is disposed at a subsequent stage of the dq-axes disturbance observer; or wherein the second spatial vector modulating section comprises a 2-phase/3-phase converting section to convert the compensated dq-axes voltage command values into 3-phase values, a third-harmonic superimposition section to superimpose a third harmonic on 3-phase converted voltages, which are outputted from the 2-phase/3-phase converting section, and output harmonic superimposition voltages, a dead time compensating section to output compensated dead time voltages in which the dead time is compensated based on the 3-phase converted voltages and the 3-phase motor currents, and an adding section to add the compensated dead time voltages to the harmonic superimposition voltages, and output the added voltages as 3-phase driving voltage command values.

Effects of the Invention

According to the electric power steering apparatus of the present invention, since the dq-axes disturbance observer is interposed in the path of the dq-axes control, the dead time of the inverter can be compensated and the compensation of the motor back-EMF and the compensation of the interference voltage due to the mutual inductance between the motor windings can also be performed without adding other elements. Further, since the control becomes smooth, the sound and the vibration of the motor, and the ripple can be suppressed.

In the present invention, since the dead time compensation is performed based on the voltage vector of the spatial vector modulation, the compensation can be performed in a case that the dead times are simultaneously generated in the plural phases. Since the timings of the dead times are individually compensated in a case that the gradient of the triangle wave carrier is positive or negative, the compensation can precisely be performed even in a case that the detection error of the current sign is often occurred.

Furthermore, since the control becomes smooth, the sound and the vibration of the motor, and the ripple can be suppressed.

BRIEF DESCRIPTION OF THE DRAWINGS

In the accompanying drawings:
FIGS. 26A to 26E are timing charts showing an operation example of generation of a dead time and compensation in the spatial vector modulating section.

MODE FOR CARRYING OUT THE INVENTION

The present invention resolves a conventional problem by adapting a dq-axes disturbance observer of a vector control and a spatial vector modulation (a third harmonic superimposition, or the third harmonic superimposition and the dead time compensation). The precise dead time compensation in response to a switch timing of an inverter is realized by generating a dead time compensation value in accordance with a voltage vector of the spatial vector modulation. The dq-axes disturbance observer compensates a change of a current phase due to a back electromotive force (a back-EMF) of the motor and an interference voltage between windings in a while speed steering or a high speed steering and reduces a timing deviation of the dead time. As a result, the dead time compensation can be performed in the while speed steering or the high speed steering (particularly, in a region that a load is low and a modulation rate is low), and a current control response, a vibration and a ripple can be improved. At the same time, the motor back-EMF in the while speed steering or the high speed steering and the interference voltage between windings can be compensated, and a steering follow-up performance and steering feeling in a turn-back steering can be also improved.

Further, the current distortion due to a magnetic saturation of the motor is compensated by making parameters of a motor model of the dq-axes disturbance observer and 2-degree-of-freedom control changeable, sensitive to a motor current.

Figure 7:
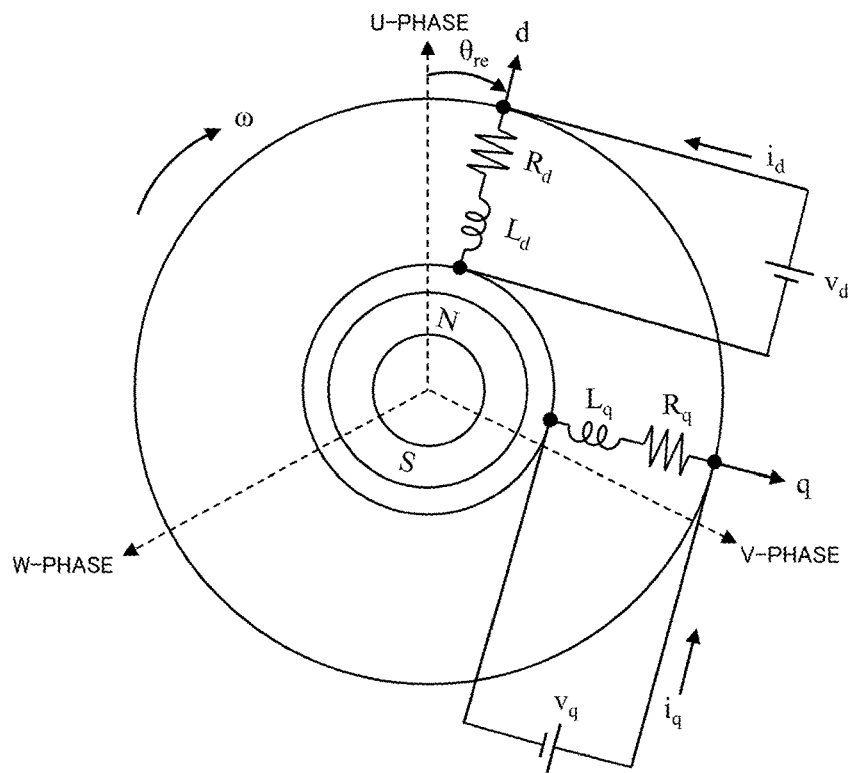
FIG. 7 is an electrical equivalent diagram showing a configuration example of a 3-phase brushless motor.

At first, an equivalent configuration of a 3-phase (a U-phase, a V-phase and a W-phase) brushless motor will be described with reference to FIG. 7. In the brushless motor, the d-axis is selected as a magnetic flux direction to which the magnetic field is generated, and the q-axis has a π/2-lead phase to the q-axis. The dq-axes armature voltages, the dq-axes currents, the dq-axes armature winding resistances, and the dq-axes self-inductances are defined as $v_d$ and $v_q$, $i_d$ and $i_q$, $R_d$ and $R_q$, and $L_d$ and $L_q$, respectively. The velocity electromotive force (the motor back-EMF) that is induced to the q-axis is represented by "0ω" where "0" denotes an interlinkage magnetic flux and "co" denotes a rotational number. A Laplace operator represents "s", and the dq-axes voltages $v_d$ and $v_d$ are represented by a following Expression 1.

$$\begin{bmatrix} v_d \\ v_q \end{bmatrix} = \begin{bmatrix} R_d + L_d s & -\omega L_q \\ \omega L_d & R_q + L_q s \end{bmatrix} \begin{bmatrix} i_d \\ i_q \end{bmatrix} + \begin{bmatrix} 0 \\ \omega \phi \end{bmatrix} \quad \text{[Expression 1]}$$

The dq-axes voltages $v_d$ and $v_q$, which are represented by the Expression 1, are nonlinear to the motor current $i_d$ and $i_q$. The dq-axes armature winding resistances $R_d$ and $R_q$ and the self-inductances $L_d$ and $L_q$ are linear elements. In order to linearize the Expression 1, it is necessary to remove the motor back-EMF 0ω, which is the nonlinear element, and interference inductances $\omega L_d$ and $\omega L_q$ from the Expression 1.

In the present invention, a whole that includes the inverter and the motor is considered to be a control object. In order to linearize the inputs from the dq-axes voltage command values $v_d$ and $v_q$ to the motor current $i_d$ and $i_q$, a dq-axes disturbance observer is interposed on the dq-axes paths. A spatial vector modulating section which has a 2-phase/3-phase conversion function and superimposes the third harmonic is also interposed. An overall configuration example of the present invention (the first embodiment) shows FIG. 8 corresponding to FIG. 3.

Figure 8:
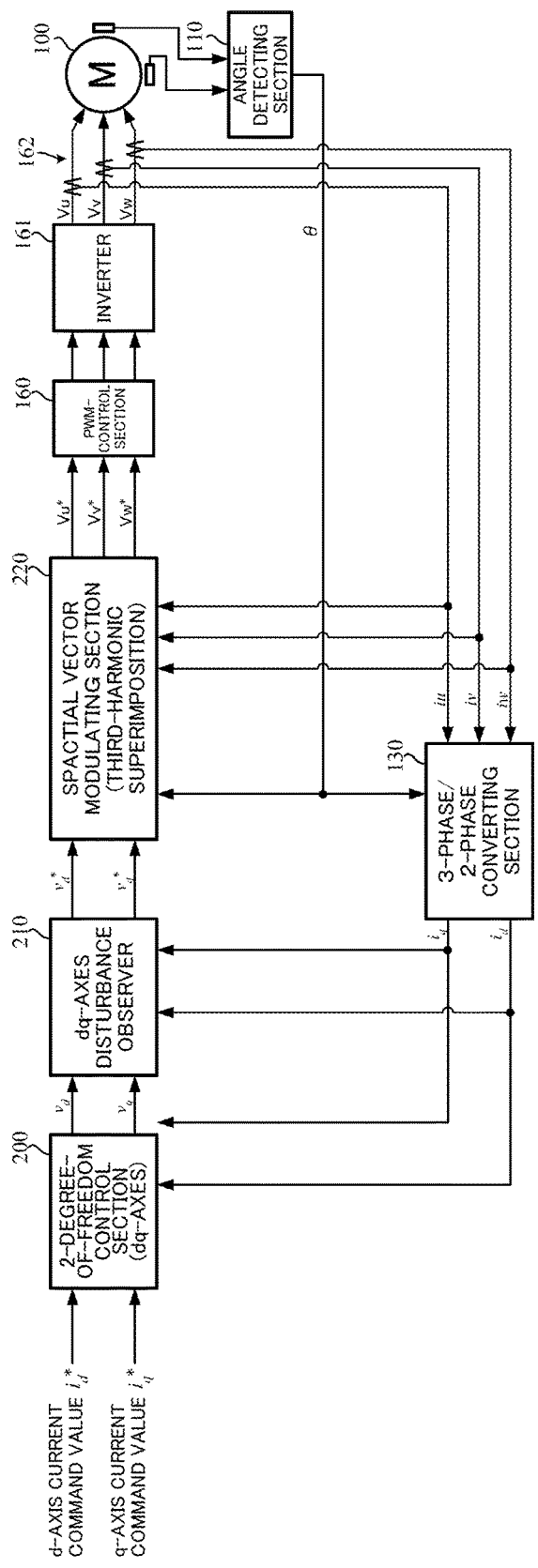
FIG. 8 is a block diagram showing a configuration example of a vector control system according to the present invention (the first embodiment)

In FIG. 8, a d-axis current command value $i_d^*$ and a q-axis current command value $i_q^*$ are inputted into a 2-degree-of-freedom control section 200. The d-axis voltage command value $v_d$ and the q-axis voltage command value $v_q$ which are calculated at the 2-degree-of-freedom control section 200 are inputted into the dq-axes disturbance observer 210. The dq-axes voltages $v_d^*$ and $v_q^*$ which are compensated at the dq-axes disturbance observer 210 are inputted into the spatial vector modulating section 220 which converts the 2-phase inputted voltages into the three voltages and superimposes the third harmonic. The voltage command values $V_u^*$, $V_v^*$ and $V_w^*$ modulated at the spatial vector modulating section 220 are inputted into a PWM-control section 160. The motor 100 is driving-controlled via the PWM-control section 160 and the inverter 161 as described above.

Figure 1:
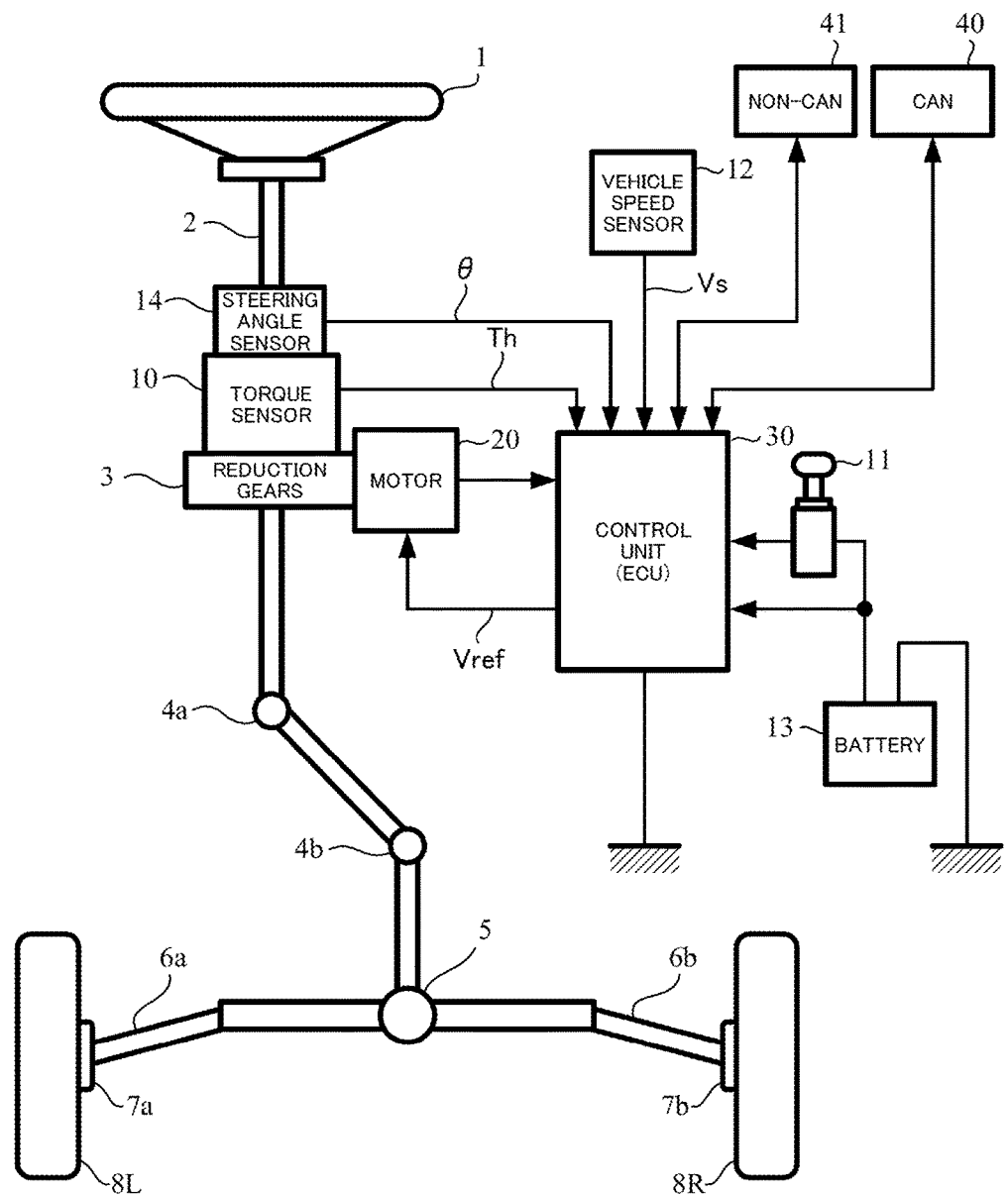
FIG. 1 is a configuration diagram showing a general outline of an electric power steering apparatus.
Figure 2:
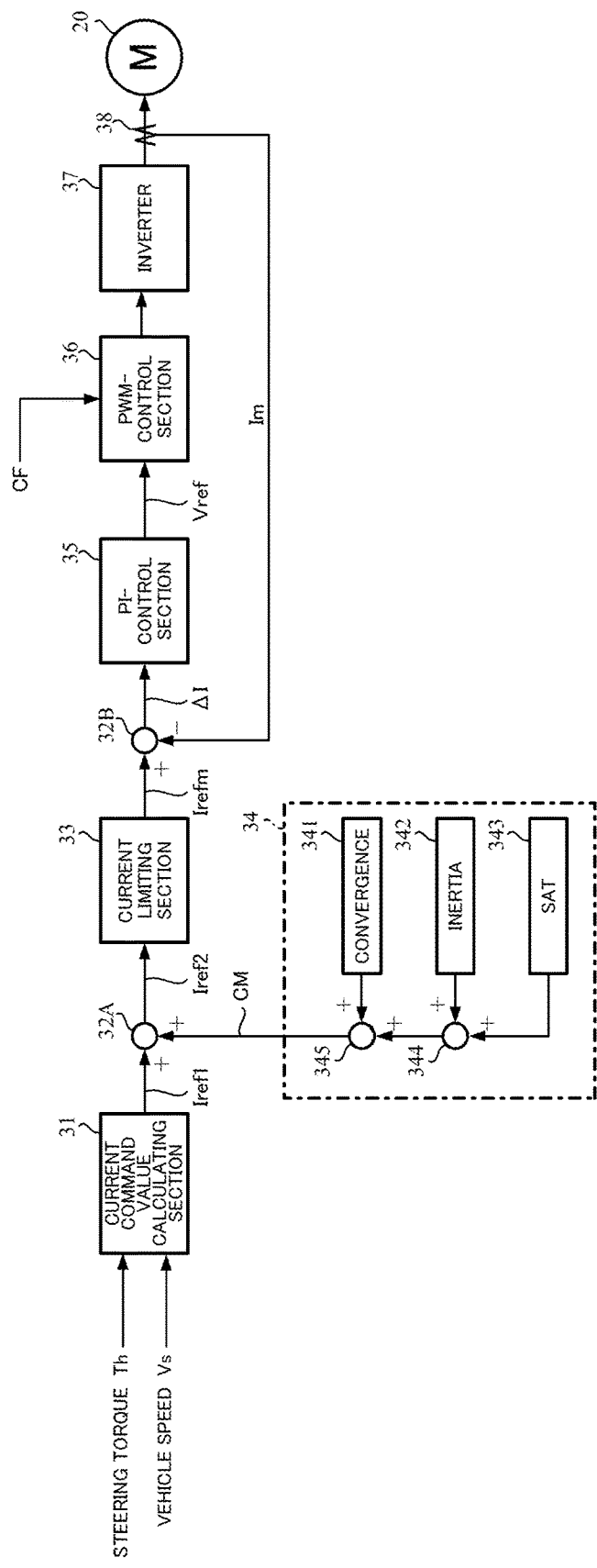
FIG. 2 is a block diagram showing a general configuration example of a control unit (ECU) of the electric power steering apparatus.
Figure 3:
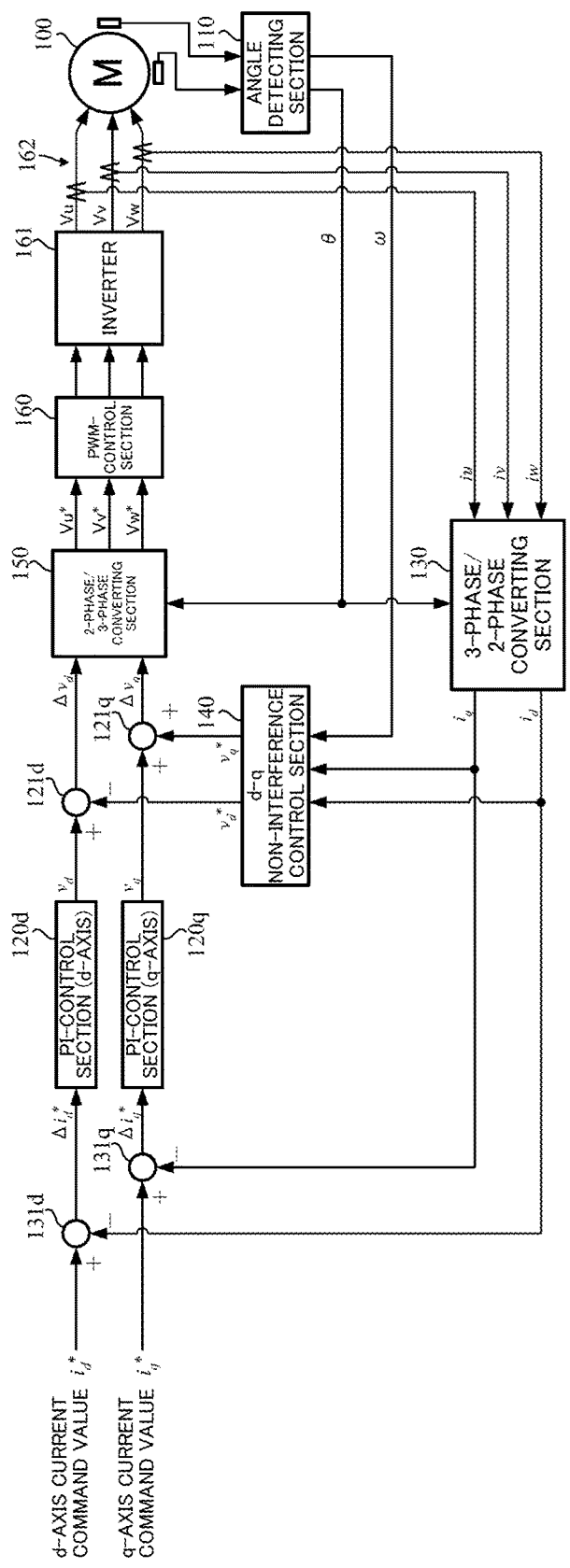
FIG. 3 is a block diagram showing a configuration example of a vector control method.
Figure 4:
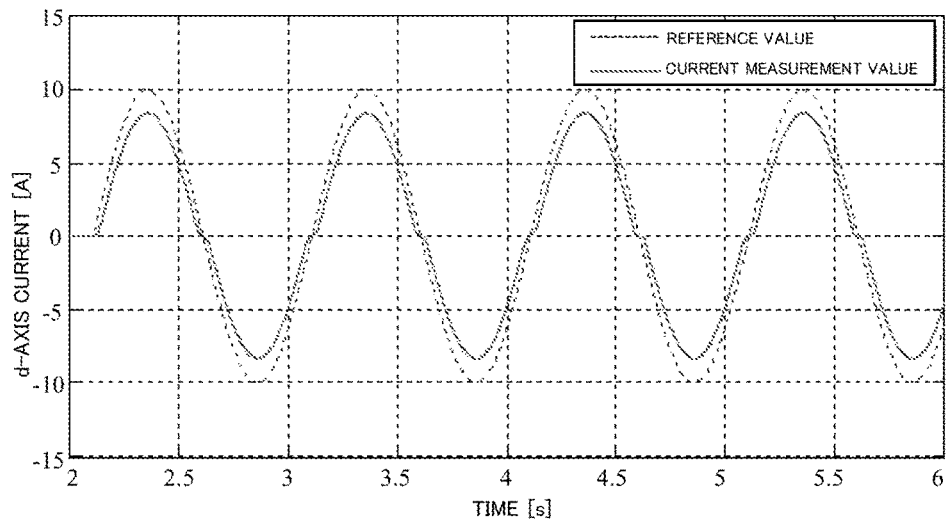
FIG. 4 is a waveform chart showing a characteristic example (a reference value and a current measurement value) of the conventional current control.
Figure 5:
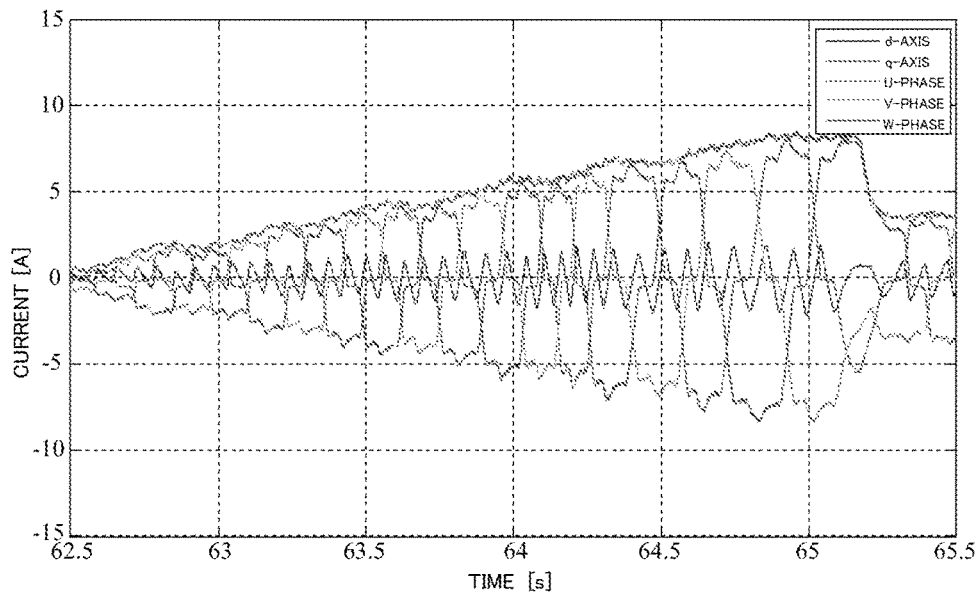
FIG. 5 is a waveform chart showing a characteristic example (dq-axes and three phases) of the conventional current control.
Figure 6:
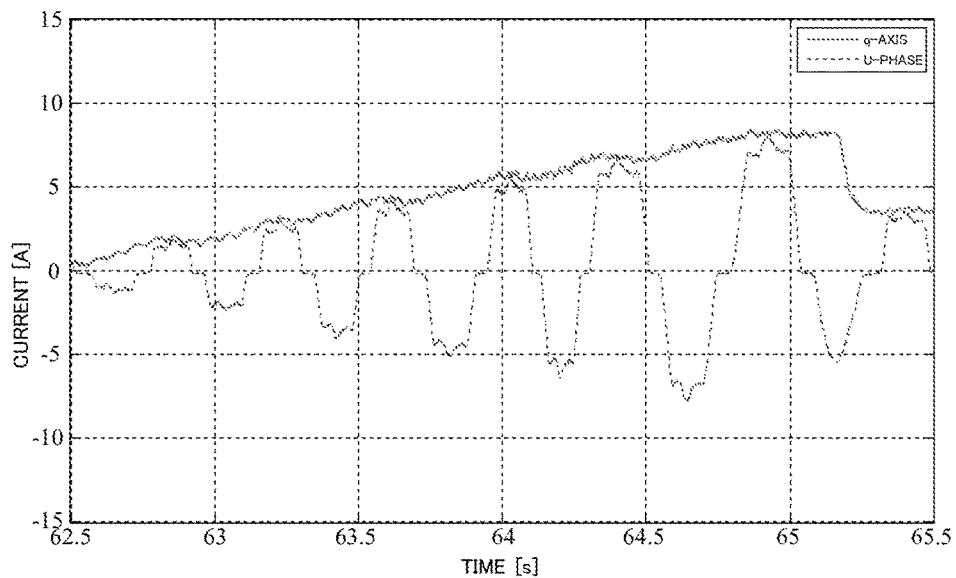
FIG. 6 is a waveform chart showing a characteristic example (a q-axis and a U-phase) of the conventional current control.

In the embodiment of FIG. 8, a d-q non-interference control section 140 shown in FIG. 3 is not shown. However, the d-q non-interference control section 140 may be disposed.

Figure 9:
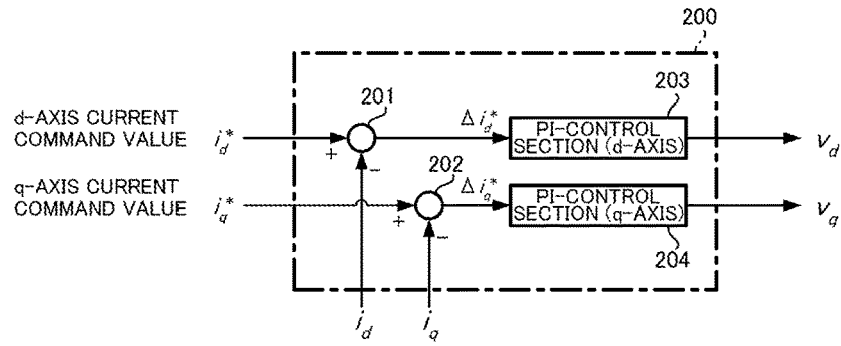
FIG. 9 is a block diagram showing a configuration example of a 2-degree-of-freedom control section system.

As shown in FIG. 9, a configuration of the 2-degree-of-freedom section 200 comprises the subtracting section 201 that calculates a current deviation $\Delta i_d^*$ that subtracts the d-axis feed-back current $i_d$ from the d-axis current command value $i_d^*$, the subtracting section 202 that calculates a current deviation $\Delta i_d^*$ that subtracts the q-axis feed-back current $i_q$ from the q-axis current command value $i_q^*$, the PI-control section 203 that the current deviation $\Delta i_d^*$ is PI-controlled and the PI-control section 204 that the current deviation $\Delta i_q^*$ is PI-controlled. The d-axis voltage command value $v_d$ is outputted from the PI-control section 203 and the q-axis voltage command value $v_q$ is outputted from the PI-control section 204.

Figure 10:
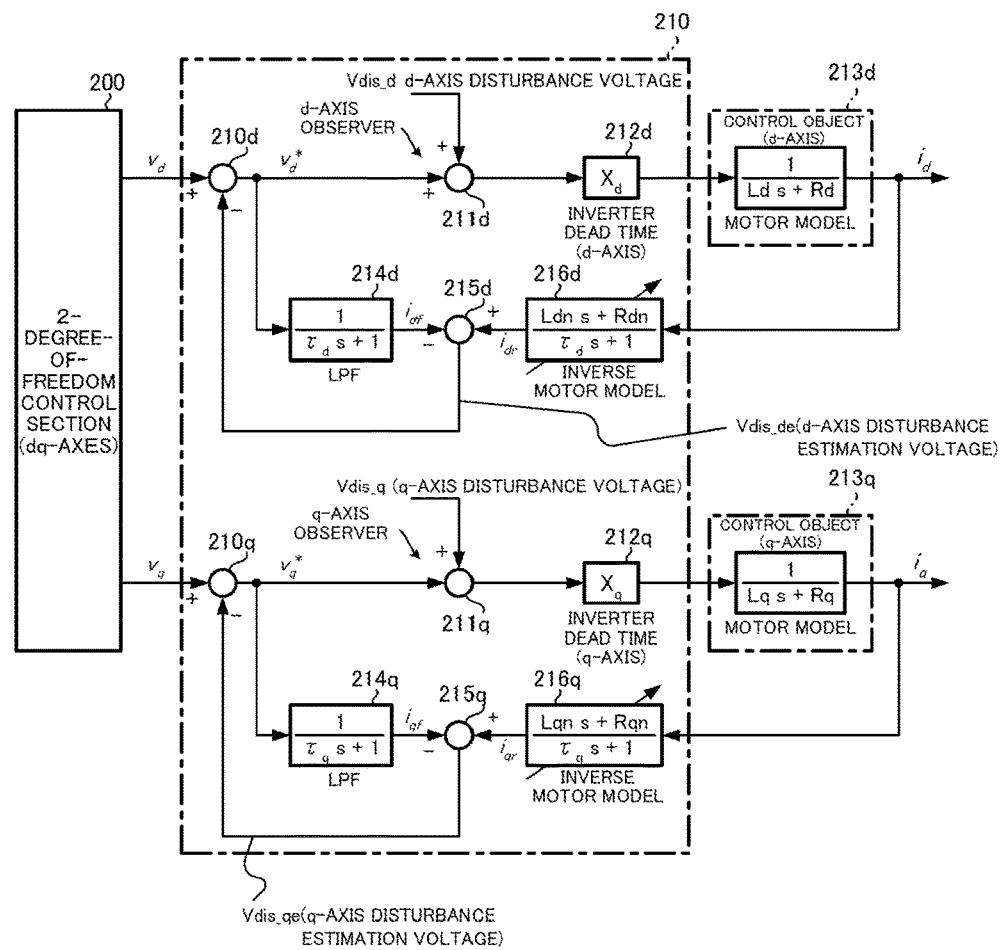
FIG. 10 is a block diagram showing a configuration example of a dq-axes disturbance observer.

The dq-axes disturbance observer 210 has a configuration shown in FIG. 10, and comprises a d-axis observer and a q-axis observer. Since the d-axis observer and the q-axis observer have the same configuration, only the q-axis observer will be described hereinafter. The voltage command value $v_q$ from the 2-degree-of-freedom control section 200 is inputted into a subtracting section 210q. The voltage deviation $v_q^*$ that a q-axis disturbance estimation voltage $V_{dis\_qe}$ is subtracted from the voltage command value $v_q$, is inputted into an adding section 211q. The q-axis disturbance voltage $V_{dsi\_q}$, which includes an induced voltage induced on the q-axis armature winding, the mutual inductance between the windings and the like, is also inputted into the adding section 211q. The added value through an inverter dead time (an unknown model Xq) 212q is inputted into the motor model 213q that is a control object and is represented by a transfer function "1/(Lq·s+Rqi)". The q-axis current $i_q$ from the motor model 213q is inputted into an inverse motor model 216q that is represented by a transfer function "(Lqn·s+Rqn)/(τ_q·s+1)", and a current $i_{qr}$ from the inverse motor model 216q is addition-inputted into a subtracting section 215q.

As well, the "Rqn" in the inverse motor model 216q is a nominal value of the armature winding resistance Rq, and the "Lqn" is a nominal value of the self-inductance Lq. The voltage deviation $V_q^*$ through a low pass filter (LPF) 214q that is represented by a transfer function "1/(τ_q·s+1)" is subtraction-inputted into the subtracting section 215q, and the q-axis disturbance estimation voltage $V_{dis\_qe}$ that is calculated at the subtracting section 215q is subtraction-inputted into the subtracting section 210q.

The voltage command values $v_d$ and $v_q$ from the 2-degree-of-freedom control section 200 are considered as an input of the dq-axes disturbance observer 210, and the dq-axes disturbance voltages $v_{dis\_d}$ and $v_{dis\_q}$ and a model error of the control objects (a model including the inverter 161 and the motor 100) are estimated as the disturbance estimation voltages $v_{dis\_de}$ and $v_{dis\_qe}$. By subtracting the disturbance estimation voltages $v_{dis\_de}$ and $v_{dis\_qe}$ from the dq-axes voltage command values $v_d$ and $v_q$, respectively, it is possible to perform a robust control. The model error includes the winding resistance errors $\Delta R_d$ and $\Delta R_q$, the self-inductance errors $\Delta L_d$ and $\Delta L_q$, and the unknown model (errors) $X_d$ and $X_q$ due to the dead time. The detail is described later.

Figure 11:
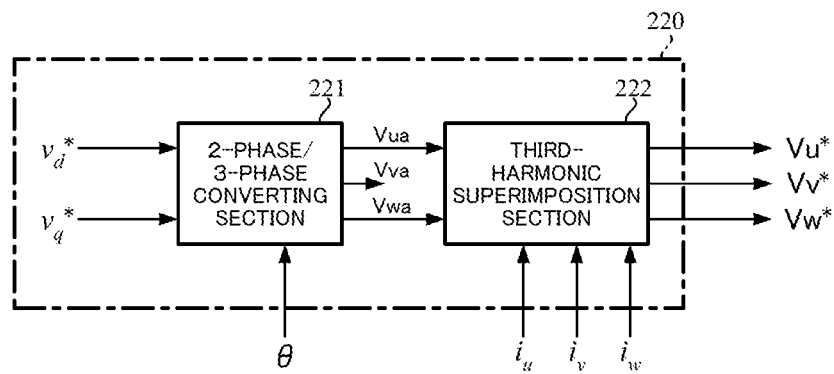
FIG. 11 is a block diagram showing a configuration example of a spatial vector modulating section (the first embodiment)

As shown in FIG. 11, the configuration of the spatial vector modulating section 220 comprises a 2-phase/3-phase converting section 221 that converts the 2-phase voltages $v_d^*$ and $v_q^*$ into the 3-phase voltages $v_{ua}$, $v_{va}$ and $v_{wa}$, and a third-harmonic superimposition section 222 that superimposes the third harmonic on the 3-phase voltages $v_{ua}$, $v_{va}$ and $v_{wa}$ and outputs the voltage command values $V_u^*$, $V_v^*$ and $V_w^*$. The motor rotational angle θ is inputted into the 2-phase/3-phase converting section 221. The 3-phase currents $i_u$, $i_v$ and $i_w$ are inputted into the third-harmonic superimposition section 222. The detail of the spatial vector modulating section 220 is described later.

The nominal values of the dq-axes armature winding resistances are defined as $R_{dn}$ and $R_{qn}$, and the nominal values of the self-inductances are defined as $L_{dn}$ and $L_{qn}$. The error values of $R_{dn}$, $R_{qn}$, $L_{dn}$ and $L_{qn}$ are $\Delta R_d$, $\Delta R_q$, $\Delta L_d$ and $\Delta L_q$, respectively. The motor parameters that are the control object are represented by the below Expression 2.

$$R_d = R_{dn}\Delta R_d, L_d = L_{dn}\Delta L_d, R_q = R_{qn}+\Delta R_q, L_q = L_{qn}+\Delta L_q \quad \text{[Expression 2]}$$

Further, voltage equations by the dq-axes disturbance observer 210 (only the q-axis is described) are represented by following Expressions 3 to 5. The filter time constant is defined as "$\tau_q$". The LPF 214q having the transfer function "$1/(\tau_q \cdot s+1)$" is an LPF that a band of the disturbance observer 210 is limited. The performance of the disturbance observer 210 is well exerted in the frequency region that is lower than a cut-off frequency of the LPF 214q. Limiting to only the frequency region that is lower than the cut-off frequency, the voltage equations are solved and the below expression 6 is derived from the Expressions 2 to 4.

$$v_q^* + v_{dis\_q} = X_q(L_q s + R_q)i_q \quad \text{[Expression 3]}$$

$$v_{dis\_qe} = (L_{qn}s + R_{qn})i_q - v_q^* \quad \text{[Expression 4]}$$

$$v_q - v_{dis\_qe} + v_{dis\_q} = X_q(L_q s + R_q)i_q \quad \text{[Expression 5]}$$

$$(L_{qn}s + R_{qn})i_q - v_{dis\_qe} + v_{dis\_q} = X_q((L_{qn}+\Delta L_q)s + (R_{qn}+\Delta R_q))i_q \quad \text{[Expression 6]}$$

By using the expressions 2, 5 and 6, the below Expression 7 is established.

$$v_q = (L_{qn}s + R_{qn})i_q \quad \text{[Expression 7]}$$

The expression 7 denotes that it can be linearized from the voltage command value $v_q$ to the current value $i_q$. In such a way, by utilizing the dq-axes disturbance observer 210 and the spatial vector modulating section 220, the induced voltage of the armature current, the interference voltage due to the mutual-inductance, the model error of the winding resistance of the motor and the self-inductance, and the unknown errors of the inverter $X_u$, $X_v$ and $X_w$ can be reduced. Apparently, the circuit equation of the 3-phase brushless motor is transformed from the above Expression 1 to the below Expression 9.

$$\begin{bmatrix} v_d \\ v_q \end{bmatrix} = \begin{bmatrix} R_{dn} + L_{dn}s & 0 \\ 0 & R_{qn} + L_{qn}s \end{bmatrix} \begin{bmatrix} i_d \\ i_q \end{bmatrix} \quad \text{[Expression 8]}$$

Figure 12:
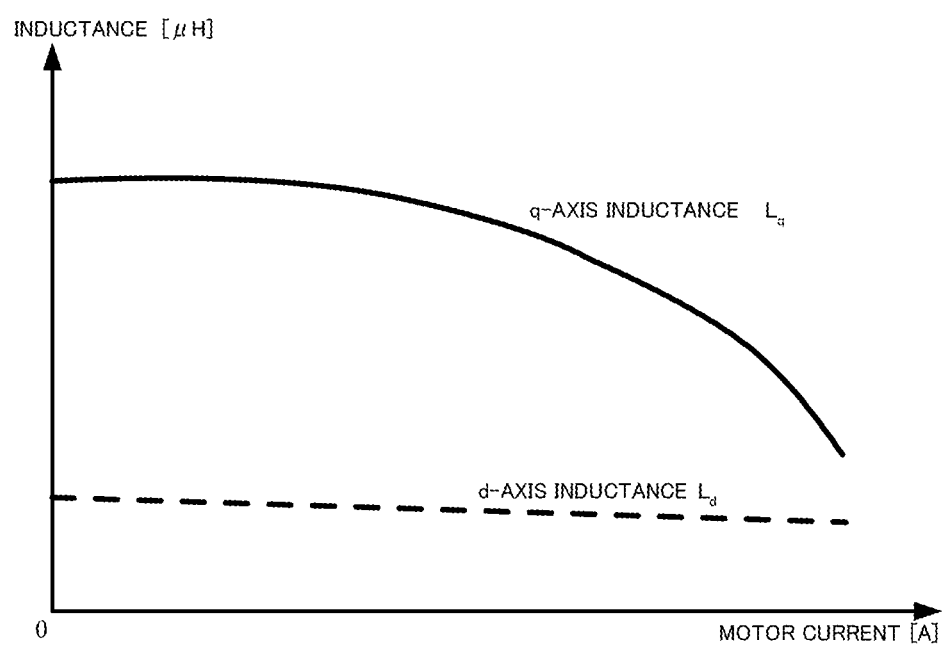
FIG. 12 is a characteristic diagram showing a characteristic example of an inductance of a motor.

As shown in FIG. 12, when the motor current increases, the self-inductances $L_d$ and $L_q$ of the motor gradually decreases due to an influence of the magnetic saturation. The dq-axes disturbance observer 210 of the present invention can change the inductances $L_{dn}$ and $L_{qn}$ of the motor inverse model in response to the motor current, and can decrease the current distortion. However, the inductances $L_{dn}$ and $L_{qn}$ are not changeable and may be set to fixed values.

Here, it is explained that the dq-axes disturbance observer are not affected from the disturbance voltage and the inverter dead time. The explanation is performed by using the q-axis. This is applicable to the d-axis. In the explanation, it is assumed as "$L_{dn}=L_d$, $L_{qn}=L_q$, $R_{dn}=R_d$" and "$R_{qn}=R_q$".

The motor current $i_q$ that is the output of the motor model 213q is represented by the below Expression 9.

$$i_q = \frac{1}{R_q + sL_q}(v_q^* + V_{dis\_q} \cdot X_q - V_{dis\_qe}) \quad \text{[Expression 9]}$$

The q-axis disturbance estimation value $V_{dis\_q}$ that is outputted from the subtracting section 215q of the dq-axes disturbance observer is represented by a following Expression 10.

$$\begin{aligned} V_{dis\_qe} &= \frac{R_q + sL_q}{1 + s\tau_q} i_q - \frac{1}{1 + s\tau_q}(v_q^* - V_{dis\_qe}) \\ &= \frac{R_q + sL_q}{1 + s\tau_q} \cdot \frac{1}{R_q + sL_q}(v_q^* + V_{dis\_q} \cdot X_q - V_{dis\_qe}) - \\ &\quad \frac{1}{1 + s\tau_q}(v_q^* - V_{dis\_qe}) \\ &= \frac{1}{1 + s\tau_q}(v_q^* + V_{dis\_q} \cdot X_q - V_{dis\_qe} - v_q^* + V_{dis\_qe}) \\ &= \frac{1}{1 + s\tau_q} V_{dis\_q} \cdot X_q \end{aligned} \quad \text{[Expression 10]}$$

The motor current $i_q$ is passed through the inverse motor model 218q, and the output $i_{qr}$ is represented by a following Expression 11.

$$i_{qr} = (v_q^* - V_{dis\_qe} + V_{dis\_q} \cdot X_q)/(\tau_q \cdot s + 1) \quad \text{[Expression 11]}$$

The input of the LPF 214q is "$v_q = v_q - V_{dis\_qe}$", and the output $i_{qf}$ is represented by a following Expression 12.

$$i_{qf} = (V_q^* - V_{dis\_qe})/(\tau_q \cdot s + 1) \quad \text{[Expression 12]}$$

Here, the q-axis disturbance estimation voltage $V_{dis\_qe}$ that is the output of the subtracting section 213q is represented by the above expression 11. By substituting the expression 10 for the expression 9, a following expression 13 is satisfied.

$$\begin{aligned} i_q &= \frac{1}{R_q + sL_q}(v_q^* + V_{dis\_q} \cdot X_q - V_{dis\_qe}) \\ &= \frac{1}{R_q + sL_q}\left(v_q^* + V_{dis\_q} \cdot X_q - \frac{1}{1+s\tau_q}V_{dis\_q} \cdot X_q\right) \\ &= \frac{1}{R_q + sL_q}\left(v_q^* + \frac{1+s\tau_q-1}{1+s\tau_q}V_{dis\_q} \cdot X_q\right) \\ &= \frac{1}{R_q + sL_q}\left(v_q^* + \frac{s\tau_q}{1+s\tau_q}V_{dis\_q} \cdot X_q\right) \\ &= \frac{1}{R_q} \cdot \frac{1}{1+s\frac{L_q}{R_q}}\left(v_q^* + \frac{s\tau_q}{1+s\tau_q}V_{dis\_q} \cdot X_q\right) \\ &= \frac{1}{R_q} \cdot \frac{1}{1+s\tau}\left(v_q^* + \frac{s\tau_q}{1+s\tau_q}V_{dis\_q} \cdot X_q\right) \end{aligned} \quad \text{[Expression 13]}$$

where, the time constant τ is equal to La/Ra (τ=La/Ra).

Figure 13:
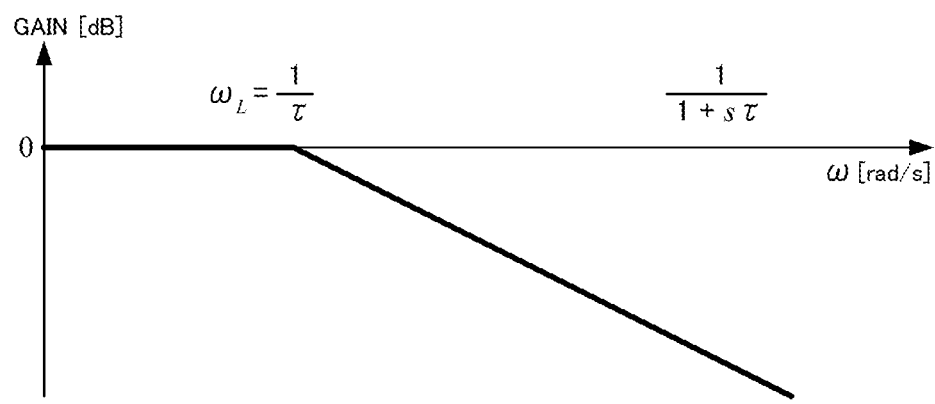
FIG. 13 is a characteristic diagram showing a characteristic example of a phase disturbance observer (a low pass filter (LPF))
Figure 14:
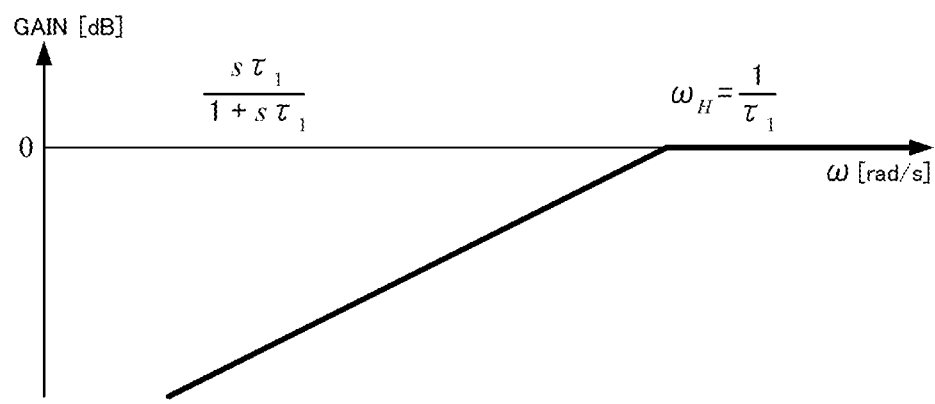
FIG. 14 is a characteristic diagram showing a characteristic example of the phase disturbance observer (LPF)

Here, FIG. 13 show an angular frequency characteristic of the transfer function "$1/(1+s\cdot\tau)$" (τ is the time constant of the motor winding). FIG. 14 shows the angular frequency characteristic of the transfer function "$s\cdot\tau_q/(1+s\cdot\tau_q)$". In the transfer function of FIG. 14 "$G_H(s)=s\cdot\tau_q/(1+s\cdot\tau_q)$", when the angular frequency ω is sufficiently smaller than an interrupt frequency, that is, a relationship "ω<<ωH" is satisfied, the transfer function $G_H(s)$ is approximated by the below Expression 14.

$$G_H(s) = \frac{s\tau_q}{1+s\tau_q} \approx 0 \quad \text{[Expression 14]}$$

The above relationship is applied to the Expression 14, and a following Equation 15 is satisfied. The output current $i_q$ is not affected by the q-axis disturbance $V_{dis\_q}$ and the dead time Xq.

$$i_q = \frac{1}{R_q} \cdot \frac{1}{1+s\tau} v_q^* \quad \text{[Expression 15]}$$

A relationship between the time constant τ of the motor winding and the filter time constant $\tau_q$ of the q-axis observer needs to satisfy the below Expression 16.

$$\frac{1}{\tau} << \frac{1}{\tau_q} \quad \text{[Expression 16]}$$

That is, a following relationship is satisfied.

$$\tau >> \tau_q \quad \text{[Expression 17]}$$

Next, the spatial vector modulation will be described. As shown in FIG. 11, the spatial vector modulating section 220 may have a function that converts the 2-phase voltages $v_d^*$ and $v_q^*$ in the d-q space into the 3-phase voltages $V_{ua}$, $V_{va}$ and $V_{wa}$, and superimposes the third harmonic on the 3-phase voltages $V_{ua}$, $V_{va}$ and $V_{wa}$. For example, the method of the spatial vector modulation that the applicant proposes in Japanese Unexamined Patent Publication No. 2017-70066, WO2017/098840 (Japanese Patent Application No. 2015-239898) and the like may be used.

Figure 15:
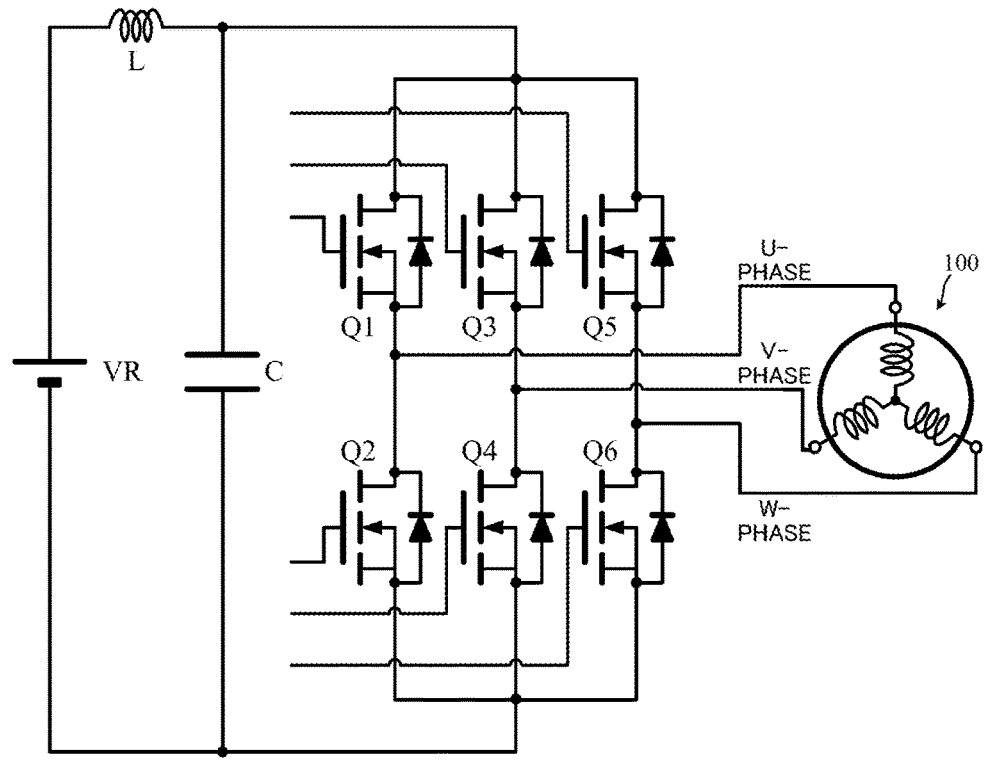
FIG. 15 is a wiring diagram showing a connection example between an inverter and the motor.
Figure 16:
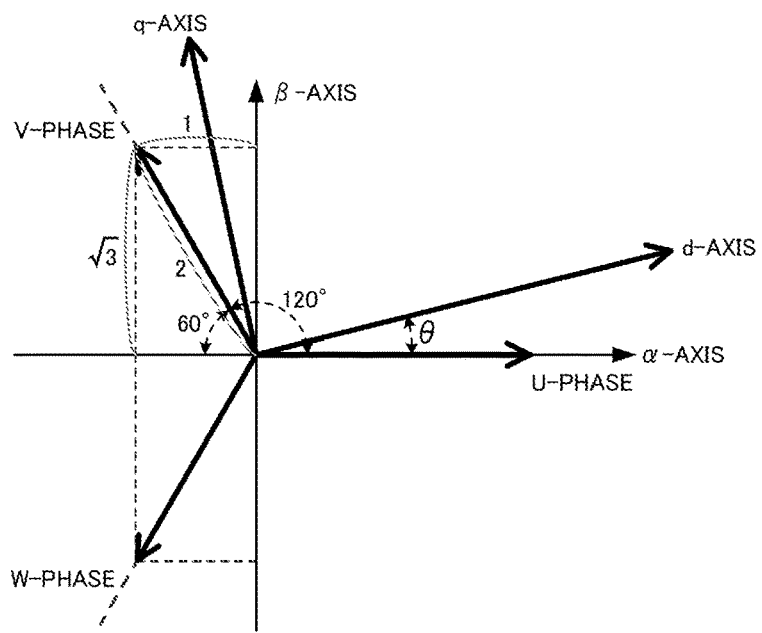
FIG. 16 is a diagram showing an operation example of the spatial vector modulating section.

That is, the spatial vector modulation has a function that performs a following coordinate transformation based on the d-axis compensated voltage $v_d^*$ and the q-axis compensated voltage $v_q^*$, the motor rotational angle θ and sector number n (#1 to #6), and controls the rotation of the motor by supplying switching patterns S1 to S6 to the motor. The switching patterns S1 to S6 are corresponding to the sectors #1 to #6, and control turning-ON/turning-OFF of the switching devices (for example, FETs) (the upper-arm Q1, Q3 and Q5, and the lower-arm Q2, Q4 and Q6) of the inverter (the inverter-applying voltage VR) with the bridge configuration as shown in FIG. 15. With reference to the coordinate transformation, in the spatial vector modulation, the voltages $v_d^*$ and $v_q^*$ perform the coordinate transformation to the voltage vectors Vα and Vβ in the α-β coordinate system based on an Expression 18. A relationship between the coordinate axes that are used in this coordinate transformation and the motor rotational angle θ is shown in FIG. 16.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^* \\ v_q^* \end{bmatrix} \quad \text{[Expression 18]}$$

A relationship shown in an Expression 19 between a target voltage vector in the d-q coordinate system and a target voltage vector in the α-β coordinate system is existed. The absolute value of the target voltage vector is conserved.

$$|V|=\sqrt{(v_d^*)^2+(v_q^*)^2}=\sqrt{V\alpha^2+V\beta^2} \quad \text{[Expression 19]}$$

Figure 17:
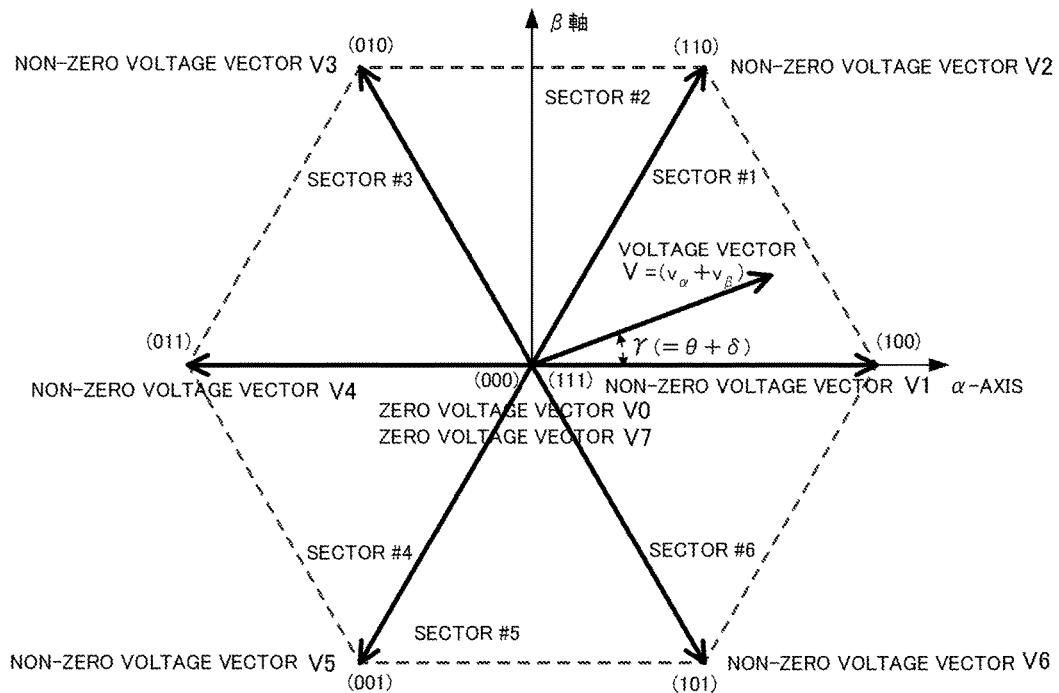
FIG. 17 is a diagram showing an operation example of the spatial vector modulating section.

In the switching pattern of the spatial vector control, the output voltage is defined by using eight discrete reference voltage vectors V0 to V7 (non-zero voltage vectors V1 to V6 that the phase differs every π/3 [rad] and zero voltage vectors V0 and V7) that are shown in the space vector diagram of FIG. 17, depending on the switching patterns S1 to S6 of the switching devices (Q1 to Q6). The selection of these reference output voltage vectors V0 to V7 and the occurring time are controlled. By using six regions sandwiched between adjacent reference output voltage vectors, the spatial vector can be divided into the six sectors #1 to #6, and the target voltage vector V is belong to any one of the sectors #1 to #6, and can be assigned to the sector number. The rotational angle γ in the α-β coordinate system of the target voltage vector V can determine which sector that is separated into a regular hexagon in the α-β space, as shown in FIG. 17, is existed in the target voltage vector V that is a synthetic vector of Vα and Vβ. The rotational angle γ is determined by a sum of the rotational angle θ of the motor and a phase δ obtained from the relationship of the voltages $v_d^*$ and $v_q^*$ in the d-q coordinate system (γ=θ+δ).

Figure 18:
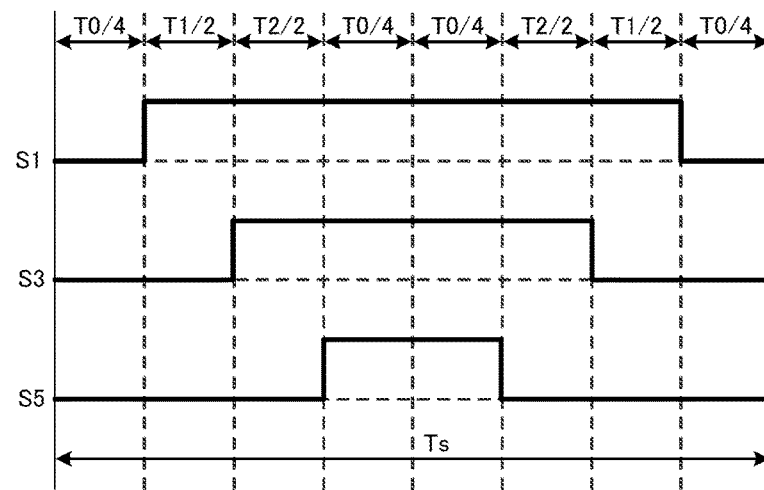
FIG. 18 is a timing chart showing an operation example of the spatial vector modulating section.

FIG. 18 shows a basic timing chart that the switching pulse width and the timing in the turning-ON/turning-OFF signals S1 to S6 to the switching devices are determined in order to output the target voltage vector from the inverter by a digital control by means of the switching patterns S1, S3 and S5 of the inverter in the spatial vector control. The spatial vector modulation performs the calculation and the like in every defined sampling period Ts, and outputs the respective pulse widths and the timings in the switching patterns S1 to S6 to which the calculation result is transformed in the next sampling period Ts.

The spatial vector modulation generates the switching patterns S1 to S6 depending on the sector number that is obtained based on the target voltage vector V. In FIG. 18, in a case of the sector number #1 (n=1), one example of the switching patterns S1 to S6 of the switching devices in the inverter is shown. The signals S1, S3 and S5 show the gate signals of the switching devices Q1, Q3 and Q5 that are corresponding to the upper-arm. The horizontal axis denotes a time, and the sampling period Ts is corresponding to the switching period and is divided into eight periods, T0/4, T1/2, T2/2, T0/4, T0/4, T2/2, T1/2 and T0/4. The periods T1 and T2 are the time depending on the sector number n and the rotational angle γ.

Figure 19:
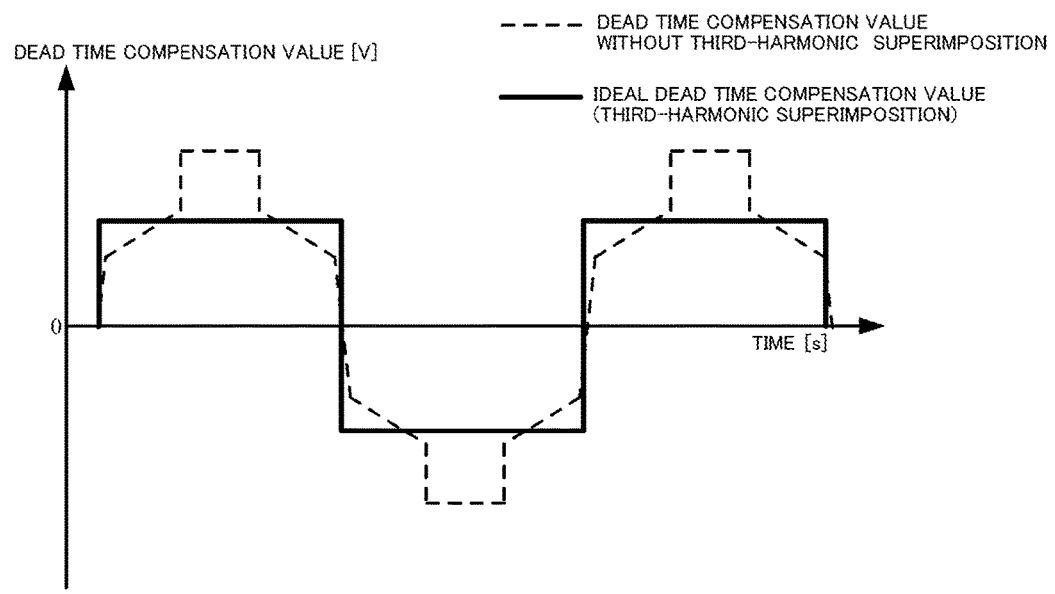
FIG. 19 is a waveform chart showing an effect of the spatial vector modulation.

In a case that the spatial vector modulation is not performed, the dead time compensation of the present invention is applied on the dq-axes, and the dead time compensation value waveform (the U-phase waveform) that the dq-axes/3-phase converting is performed to only the dead time compensation value is shown in a waveform represented by a dashed line of FIG. 19 that the third-order component is removed. The same phenomena are exhibited in the V-phase and the W-phase. By applying the spatial vector modulation instead of the dq-axes/3-phase converting, the third-harmonic can be superimposed on the 3-phase signals, the third-order component that is removed by the 3-phase converting can be compensated, and the ideal dead time compensation waveform that is shown in a solid line of FIG. 19 can be generated.

Figure 20:
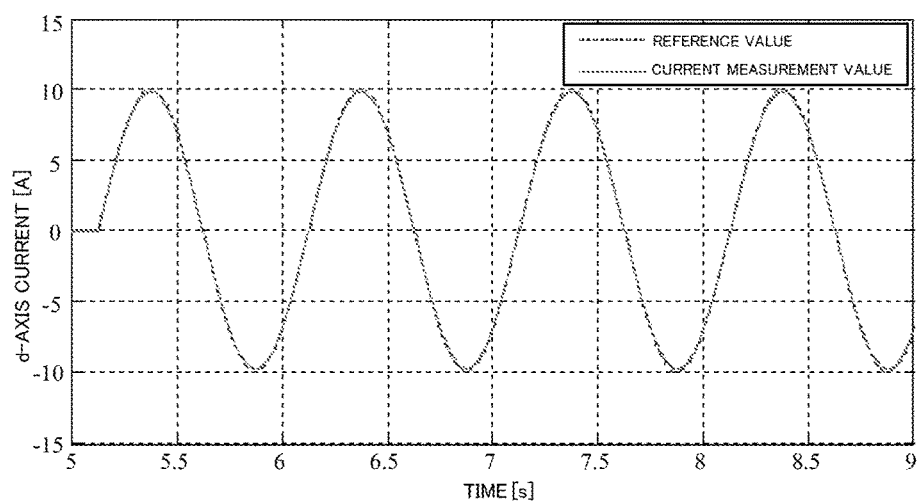
FIG. 20 is a waveform chart showing a characteristic example (a reference value and a current measurement value) of the current control of the present invention.
Figure 21:
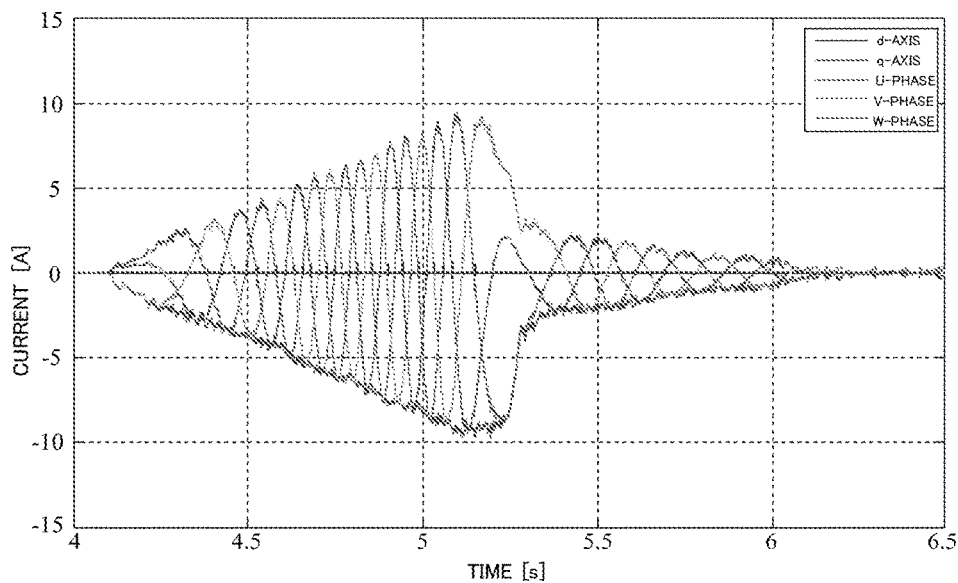
FIG. 21 is a waveform chart showing a characteristic example (the dq-axes and three phases) of the current control of the present invention.
Figure 22:
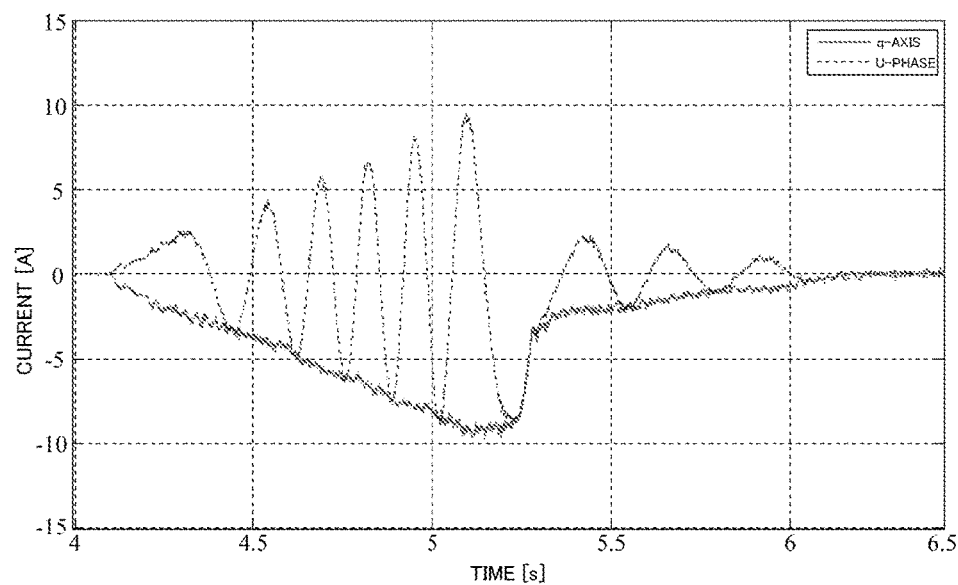
FIG. 22 is a waveform chart showing a characteristic example (the q-axis and a U-phase) of the current control of the present invention.

In a case that the dq-axes disturbance observer and the spatial vector modulation are operated, FIG. 20 is a result when the sinusoidal wave is inputted into the d-axis current command value. In comparison with the case that the dq-axes disturbance observer is not existed, the waveform distortions of the d-axis current value and the 3-phase current values are reduced, and the error is not almost generated. Showing the motor current when the handle is slowly steered from a straight running state (an on-center state), as shown in FIG. 21 and FIG. 22, it is understood that the distortions of the phase currents are improved, and the vibration and the ripple of the q-axis current (the torque) are reduced.

Figure 23:
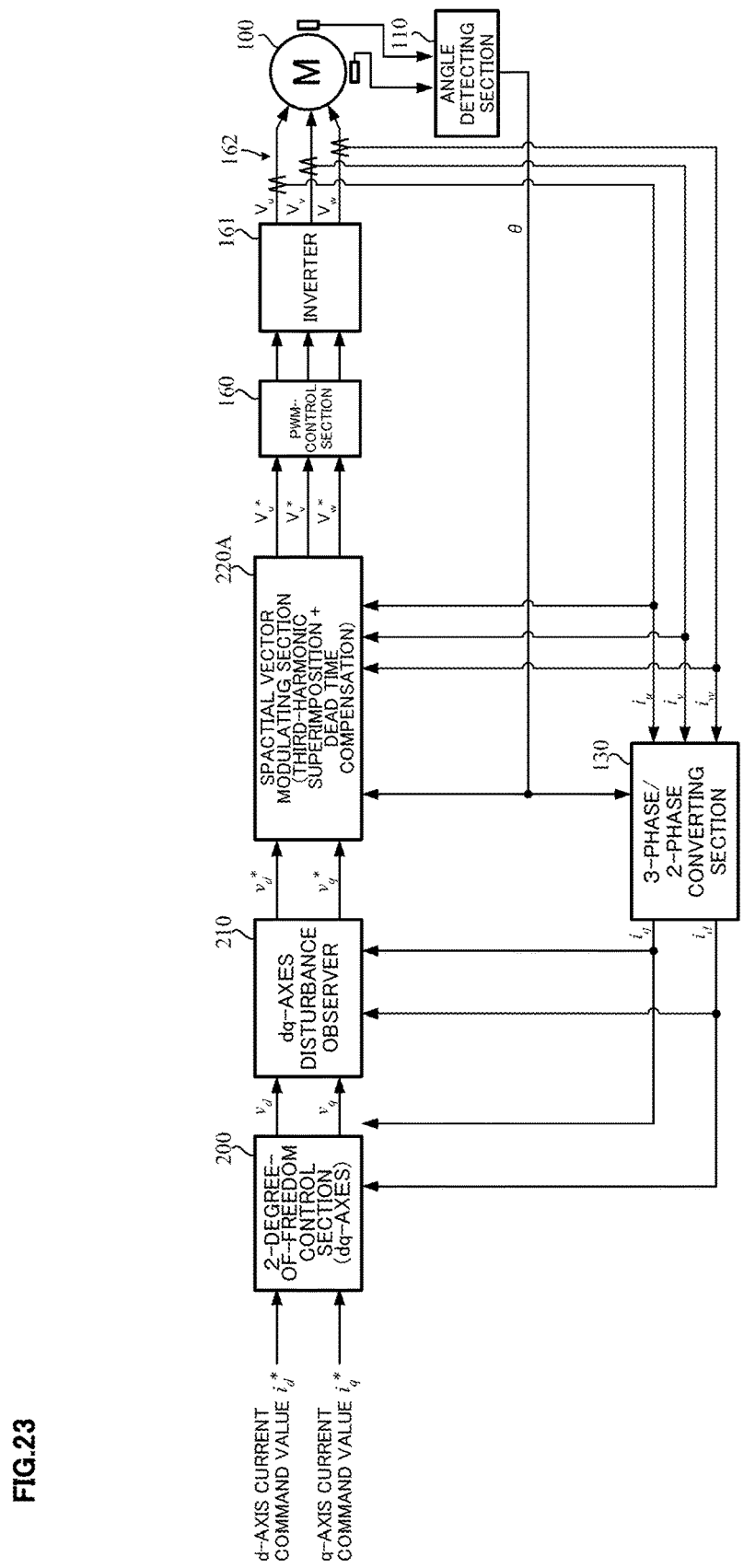
FIG. 23 is a block diagram showing a configuration example of the vector control system according to the present invention (the second embodiment)

Next, the second embodiment of the present invention will be described with reference to FIG. 23 corresponding to FIG. 8. In the second embodiment, only the spatial vector modulating section 220A is different from that of the first embodiment. Other configurations and operations are the same as those of the first embodiment.

Figure 24:
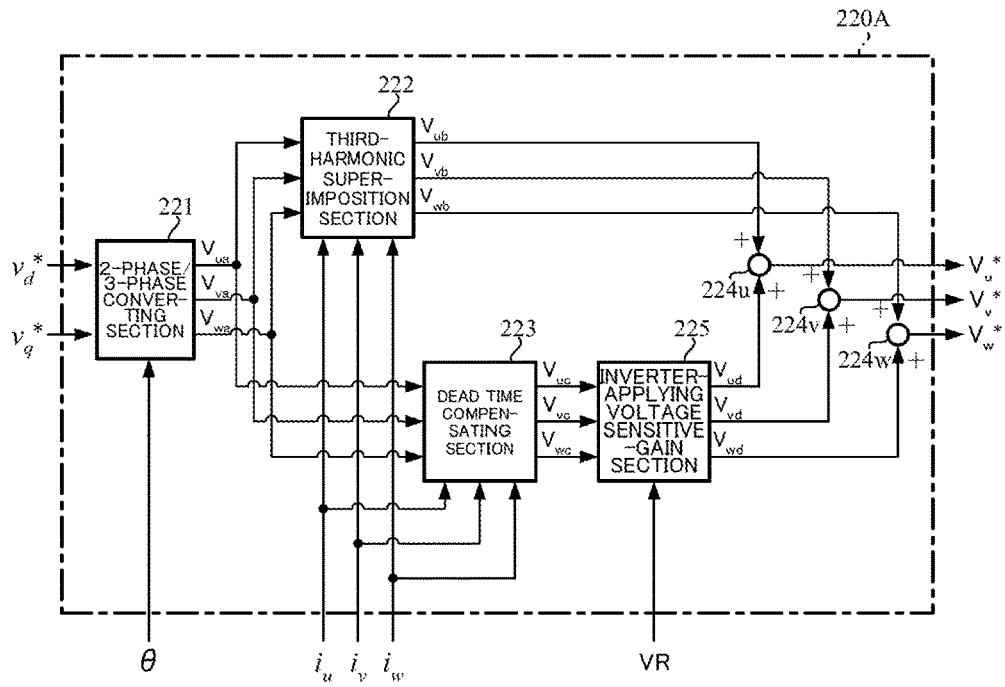
FIG. 24 is a block diagram showing a configuration example of the spatial vector modulating section (the second embodiment)

As shown in FIG. 24, the configuration of the spatial vector modulating section 220A comprises a 2-phase/3-phase converting section 221 to convert the 2-phase compensated dq-axes voltage command values $v_d^*$ and $v_q^*$ from the dq-axes disturbance observer 210 into the 3-phase voltages $V_{ua}$, $V_{va}$ and $V_{wa}$ depending on the motor rotational angle θ, a third-harmonic superimposition section 222 to input the 3-phase motor currents $i_u$, $i_v$ and $i_w$, superimpose the third-harmonic on the 3-phase voltages $V_{ua}$, $V_{va}$ and $V_{wa}$, and output the harmonic-superimposed voltages $V_{ub}$, $V_{vb}$ and $V_{wb}$, a dead time compensating section 223 to input the 3-phase motor currents $i_u$, $i_v$ and $i_w$, and the 3-phase voltages $V_{ua}$, $V_{va}$ and $V_{wa}$, compensate the switching dead time of the inverter, and output the compensated dead time voltages $V_{ud}$, $V_{vd}$ and $V_{wd}$, an inverter applying voltage sensitive gain section 225 to multiply the voltages $V_{uc}$, $V_{vc}$ and $V_{wc}$ from the dead time compensation section 223 by a compensation gain depending on the inverter applying voltage VR, and adding sections 224u, 224v and 224w to respectively add the compensation voltages $V_{ua}$, $V_{vd}$ and $V_{wd}$ from the inverter-applying voltage sensitive-gain section 225 to the harmonic-superimposed voltages $V_{ub}$, $V_{vb}$ and $V_{wb}$, and respectively output 3-phase driving voltage command values $V_u^*$, $V_v^*$ and $V_w^*$.

Figure 25:
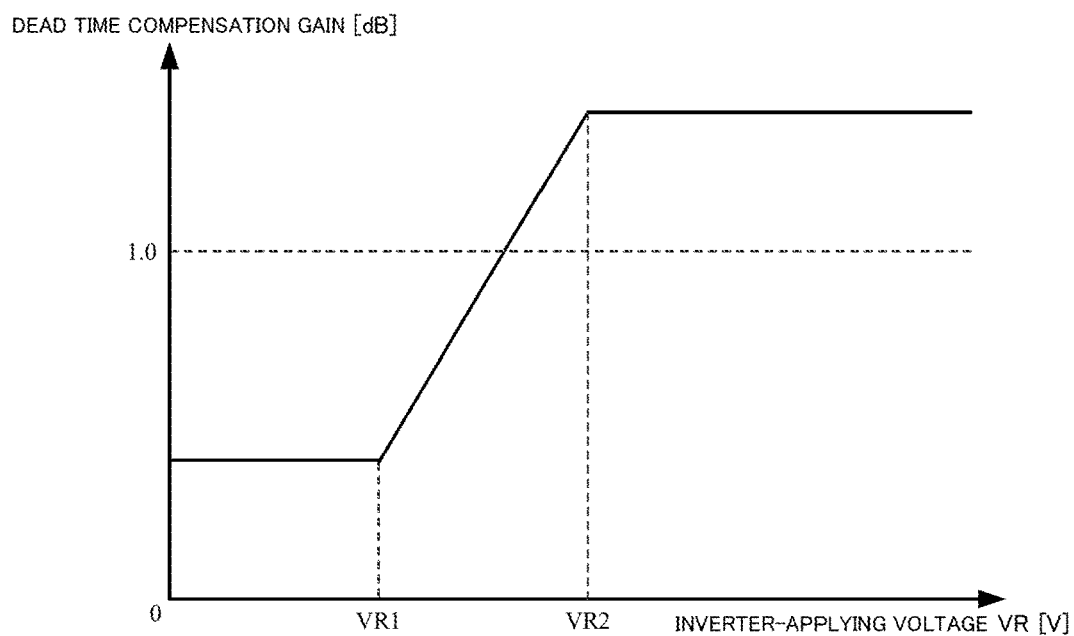
FIG. 25 is a characteristic diagram showing a characteristic example of a dead time compensation gain.

The characteristic of the inverter-applying voltage sensitive-gain section 225 is shown in, for example, FIG. 25. That is, the dead time compensation gain is a constant value which is less than "1.0" when the inverter-applying voltage is lower than "VR1", gradually increase a gain value when the inverter-applying voltage is equal to or higher than "VR1" and is lower than "VR2" (>VR1), and is a constant gain which is more than "1.0" when the inverter-applying voltage is equal to or higher than "VR2".

The function of the dead time compensation in the spatial vector modulating section 220A of the present invention is a countermeasure in a case that the dead times are simultaneously generated in the plural phases. The dq-axes disturbance observer 210 performs compensation due to the back-EMF and the d-q interference voltage. Particularly, in a case that the compensation to the back-EMF is not exerted well, the timing of the dead time compensation is deviated and the compensation cannot be served. Considering the above deviation, the dq-axes disturbance observer 210 performs the dead time compensation more precisely.

The operation of the dq-axes disturbance observer 210 is the same as that of the first embodiment. The configuration and the operation of the 2-phase/3-phase converting section 221 and the third-harmonic superimposition section 222 at the spatial vector modulating section 220A (the third-harmonic superimposition and the dead time compensation) are the same as those of the first embodiment. Accordingly, the dead time compensation by the spatial vector modulation will be described.

Generally, the spatial vector modulation represents the switching mode of the inverter by using eight voltage vectors V1 to V8, determines a combination of the voltage vectors from the voltage command values $v_d^{}$ and $v_q^{}$, and the motor rotational angle (the electric angle) θ, and performs the switching control. The voltage vectors are represented by using "1" which indicates that the upper-FETs of the inverter are turned-ON and "0" which indicates that the lower-FETs of the inverter are turned-ON, and are denoted by the below Expression 20.

$$V0(000), V1(100), V2(110), V3(010), V4(011), V5(001),$$
$$V6(101) \text{ and } V7(111) \quad \text{[Expression 20]}$$

The combinations of the figures in the parentheses denote switching states of the FETs of U-phase, V-phase and W-phase in order. The voltage vector V0 and V7 are a zero-vector, as shown in FIG. 17.

Figure 26A:
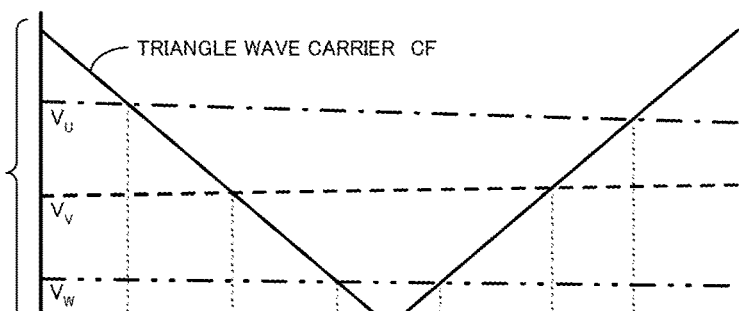

The spatial vector modulation determines the sector of the voltage vectors from the voltage command values $v_d^*$ and $v_d^*$, and the motor rotational angle θ, and controls the voltage by synthesizing the eight voltage vectors. Taking the voltage vector V of FIG. 17 as an example, the voltage vector V is existed in the sector #1 and is represented by the combination of the voltage vectors V1, V2, V0 and V7. The switching times are assigned in proportion to the magnitudes of the respective voltage vectors, and the voltage is controlled. As shown in FIGS. 26A and 26D, the voltage vectors "V1, V2, V0 and V7" are set corresponding to the time point when the U-phase voltage $V_u$ crosses the triangle carrier CF, the time point when the V-phase voltage $V_v$ crosses the triangle carrier CF, and the time point when the W-phase voltage $V_w$ crosses the triangle carrier CF. The ideal voltage vector is shown in FIG. 26D. However, the actual voltage vector is shown in FIG. 26E. That is, in a case that the voltage vector is transited from V0 to V1, the dead time (Du) is generated and the actual voltage vector (before the correction) is transited at the timing which is later than a transition timing of the ideal voltage vector. In the corrected voltage vector, the delay is predicted and the timing when the voltage vector is transited from V0 to V1 is faster than that of the actual voltage vector (before the correction). As a result, the corrected voltage vector is approximated to the ideal voltage vector.

However, since the dead time of the inverter is existed, the voltage error is occurred, as shown in FIG. 26C. In the present invention, when the switching time is assigned, the voltage in the time section when the dead time is generated is compensated, as shown in FIG. 26E.

The spatial vector modulating section 220A calculates the ideal voltage vector (FIG. 26D) from the dq-axes voltage command values $v_d^*$ and $v_q^*$ which are an input. The respective inverter voltage command values (FIG. 26A) and the PWM-signals (FIG. 26C) are determined from the voltage vectors. The voltage vector is transited at the intersections between the triangle wave carrier CF and the respective inverter voltage command values $V_u$, $V_v$ and $V_w$. The transition of the voltage vector is largely delayed at the time point when the dead time is generated (the voltage vector before the correction in FIG. 26E). The time point when the dead time is generated is predicted and the timing when the voltage vector is transited faster than that of the actual voltage vector (before the correction). As a result, the corrected voltage vector is approximated to the ideal voltage vector, as shown in FIG. 26D.

Figure 26B:
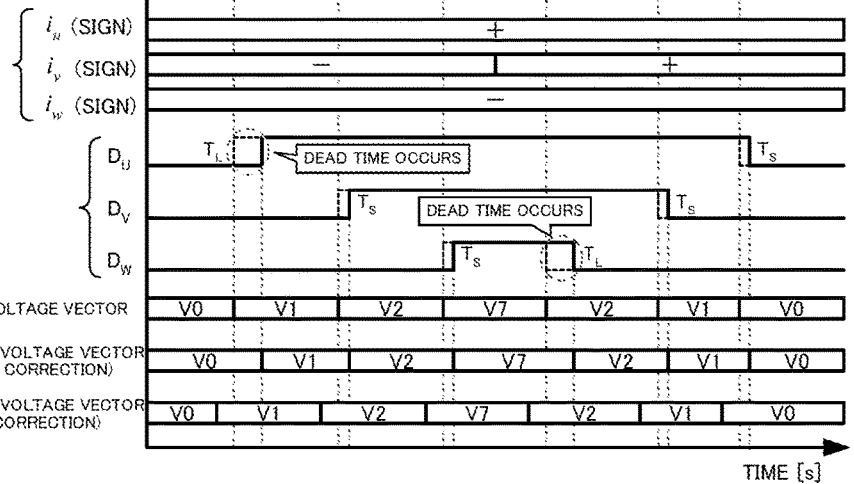

As described below, in a case that a gradient of the triangle wave carrier CF shown in FIG. 26A is negative, the dead time and the turning-ON time of the FETs are occurred in the U-phase whose current sign is positive as shown in FIG. 26B, and the switch timing is largely delayed (the delay time is $T_L$). Since only the turned-OFF times of the FETs are existed in the V-phase and the W-phase, the delay is short (the delay time is $T_S$).

At first, in order to compensate the delay time $T_L$, the delay time $T_L$ is subtracted from the time T1 of the voltage vector V0, and the time T1 is corrected to the time T1'.

$$T1'=T1-T_L \qquad \text{[Expression 21]}$$

Next, the delay time $T_L$ is added to the time T2 of the voltage vector V1, the delay time $T_S$ to the voltage vector V2 is subtracted from the added time, and the time T2 is corrected to the time T2'.

$$T2'=T2+T_L-T_S \qquad \text{[Expression 22]}$$

The delay time $T_S$ from the voltage vector V1 to the voltage vector V2 is added to the time T3 of the voltage vector V2, the delay time $T_S$ to the voltage vector V7 is subtracted from the added time, and the correction to the time T3 is not performed.

$$T3'=T3+T_S-T_S=T3 \qquad \text{[Expression 23]}$$

The delay time $T_S$ is added to the time T4 of the voltage vector V7, and the time T4 is corrected to the time T4'.

$$T4'=T4+T_S \qquad \text{[Expression 24]}$$

In a case that the gradient of the triangle wave carrier CF shown in FIG. 26A is positive, the dead time and the turning-ON time of the FETs are occurred in the W-phase whose current sign is negative as shown in FIG. 26C, and the switch timing is largely delayed (the delay time is $T_L$). Since only the turned-OFF times of the FETs are existed in the U-phase and the V-phase, the delay is short (the delay time is $T_S$). As described above, in order to compensate the delay time $T_L$, the delay time $T_L$ is subtracted from the time T5 of the voltage vector V7, and the time T5 is corrected to the time T5'.

$$T5'=T5-T_L \qquad \text{[Expression 25]}$$

Next, the delay time $T_L$ is added to the time T6 of the voltage vector V2, the delay time $T_S$ to the voltage vector V1 is subtracted from the added time, and the time T6 is corrected to the time T6'.

$$T6'=T6+T_L-T_S \qquad \text{[Expression 26]}$$

The delay time $T_S$ from the voltage vector V2 to the voltage vector V1 is added to the time T7 of the voltage vector V1, the delay time $T_S$ to the voltage vector V0 is subtracted from the added time, and the correction to the time T7 is not performed.

$$T7'=T7+T_S-T_S=T7 \qquad \text{[Expression 27]}$$

The delay time $T_S$ is added to the time T8 of the voltage vector V0, and the time T8 is corrected to the time T8'.

$$T8'=T8+T_S \qquad \text{[Expression 28]}$$

This is a compensation example of the dead time. However, the output voltage error pattern is determined by a combination of the signs of the respective motor currents ($i_u$, $i_v$ and $i_w$), the gradient of the triangle wave carrier CF and the sectors #1 to #6 of the voltage vector. The combination table is shown below. The output voltage error pattern in a case that the gradient of the triangle wave carrier CF is positive is shown in the below Table 1 (refer to FIGS. 26A to 26E).

TABLE 1

| polarity of current | | | sector of voltage vector | | | | | |
|---|---|---|---|---|---|---|---|---|
| iu | iv | iw | sector #1 | sector #2 | sector #3 | sector #4 | sector #5 | sector #6 |
| + | + | − | P1 | P1 | P3 | P5 | P5 | P3 |
| + | − | − | P2 | P4 | P6 | P6 | P4 | P2 |
| + | − | + | P3 | P5 | P5 | P3 | P1 | P1 |
| − | + | − | P4 | P2 | P2 | P4 | P6 | P6 |
| − | + | + | P5 | P3 | P1 | P1 | P3 | P5 |
| − | − | + | P6 | P6 | P4 | P2 | P2 | P4 |

The output voltage error pattern in a case that the gradient of the triangle wave carrier CF is negative is shown in the below Table 2 (refer to FIGS. 26A to 26E). Since the expressions 25 to 28 are similar to the Expressions 21 to 24. The similar notation to the Table 2 is omitted.

TABLE 2

| polarity of current | | | sector of voltage vector | | | | | |
|---|---|---|---|---|---|---|---|---|
| iu | iv | iw | sector #1 | sector #2 | sector #3 | sector #4 | sector #5 | sector #6 |
| + | + | − | P2 | P2 | P4 | P6 | P6 | P4 |
| + | − | − | P1 | P3 | P5 | P5 | P3 | P1 |
| + | − | + | P4 | P6 | P6 | P4 | P2 | P2 |
| − | + | − | P3 | P1 | P1 | P3 | P5 | P5 |
| − | + | + | P6 | P4 | P2 | P2 | P4 | P6 |
| − | − | + | P5 | P5 | P3 | P1 | P1 | P3 |

When the output voltage error patterns P1 to P6 are determined by the above combination tables, in accordance with a following Table 3, the compensation value by the output voltage error patterns are calculated. The output times of the respective voltage vectors before compensation are defined as T1 to T4, and the output times of the respective voltage vectors after the compensation are defined as T1' to T4'. The delay time $T_L$ is calculated by the dead time $T_D$ and the FET turning-ON time $T_{ON}$. The dead time $T_D$ is changeable, sensitive to the motor current, and the values of the dead times $T_D$ are listed on a map. The map can be created by performing the dead time characteristic test of the inverter. The delay time $T_D$ is the FET turning-OFF time $T_{OFF}$. The turning-ON time $T_{ON}$ and the turning-OFF time $T_{OFF}$ are listed on the FET characteristic data sheet of the respective manufacturer.

$$T_L=T_D-T_{ON}$$

$$T_S=T_{OFF} \qquad \text{[Expression 29]}$$

TABLE 3

| output voltage error pattern | voltage error correction | | | |
|---|---|---|---|---|
| | T1' | T2' | T3' | T4' |
| P1 | T1 − TL | T2 | T3 + (TL − TS) | T4 + TS |
| P2 | T1 − TL | T2 + (TL − TS) | T3 | T4 + TS |
| P3 | T1 − TL | T2 + (TL − TS) | T3 − (TL − TS) | T4 + TL |
| P4 | T1 − TS | T2 − (TL − TS) | T3 + (TL − TS) | T4 + TS |

TABLE 3-continued

| output voltage error pattern | voltage error correction | | | |
|---|---|---|---|---|
| | T1' | T2' | T3' | T4' |
| P5 | T1 − TS | T2 − (TL − TS) | T3 | T4 + TL |
| P6 | T1 − TS | T2 | T3 − (TL − TS) | T4 + TL |

Figure 27:
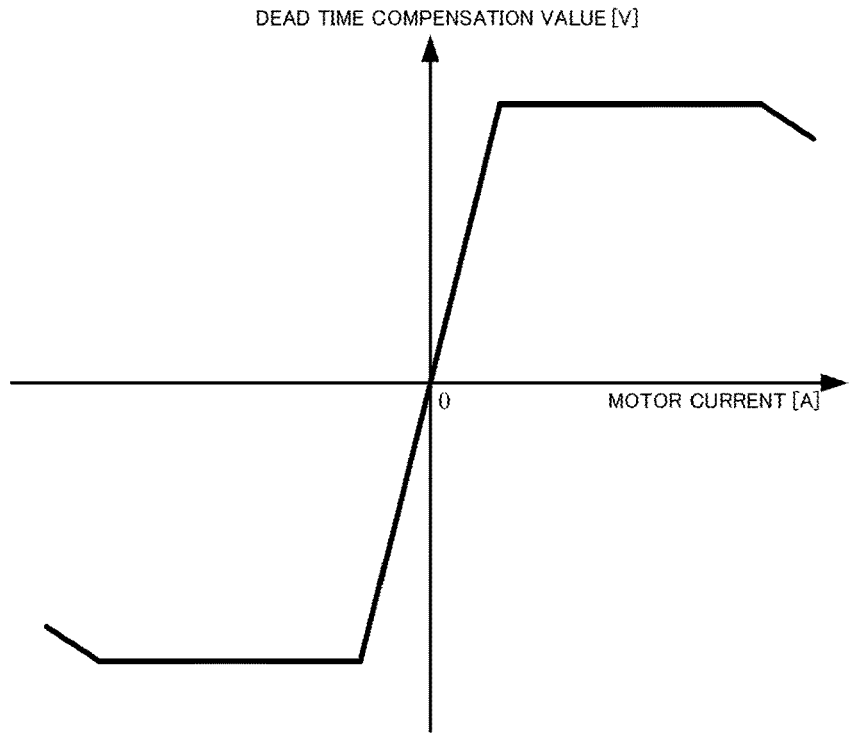
FIG. 27 is a characteristic diagram showing a configuration example of a dead time compensation value.

In accordance with the characteristic of FIG. 27, the dead time compensation value may be changeable depending on the motor current.

The harmonic superimposition voltages $V_{ub}$, $V_{vb}$ and $V_{wb}$ from the third-harmonic superimposition section 222 are inputted into the adding sections 224u, 224v and 224w, respectively. The compensated dead time voltages $V_{uc}$, $V_{vc}$ and $V_{wc}$ from the dead time compensating section 223 are multiplied with the compensation gain at the inverter-applying voltage sensitive-gain section 225, and the compensation voltage $V_{ud}$, $V_{vd}$ and $V_{wd}$ are respectively inputted into the adding sections 224u, 224v and 224w. The 3-phase driving voltage command values $V_u^*$, $V_v^*$ and $V_w^*$ which are added results from the adding sections 224u, 224v and 224w are outputted.

Figure 28:
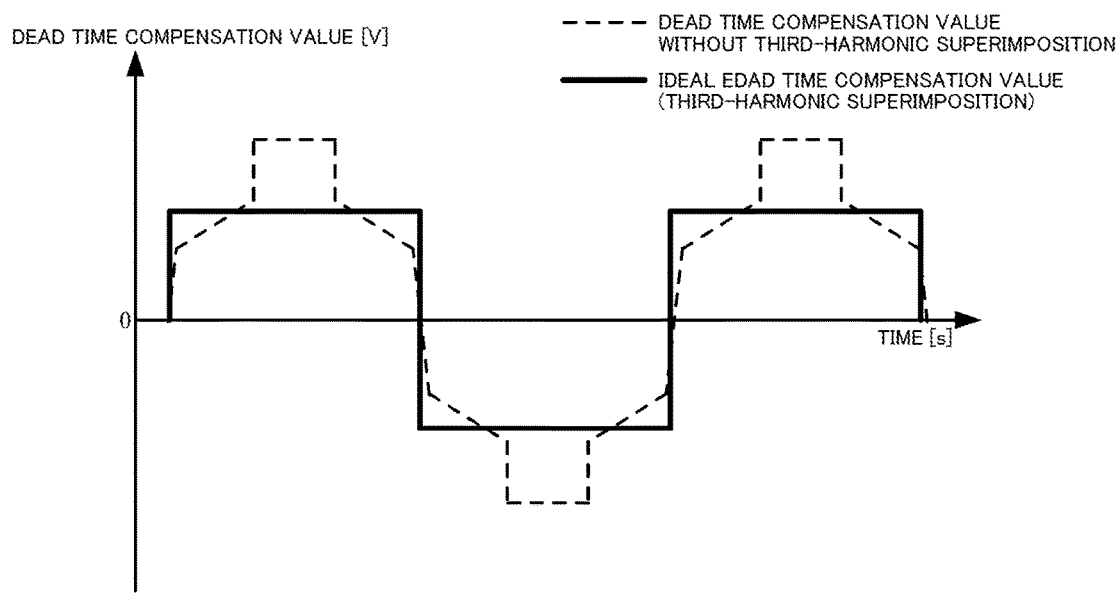
FIG. 28 is a waveform chart showing an effect of the spatial vector modulation.

In a case that the spatial vector modulation is not performed, the dead time compensation of the present invention is applied on the dq-axes, and the dead time compensation value waveform (the U-phase waveform) that the dq-axes/3-phase converting is performed to only the dead time compensation value is shown in a waveform represented by a dashed line of FIG. 28 that the third-order component is removed. The same phenomena are exhibited in the V-phase and the W-phase. By applying the spatial vector modulation instead of the dq-axes/3-phase converting, the third-harmonic can be superimposed on the 3-phase signals, the third-order component that is removed by the 3-phase converting can be compensated, and the ideal dead time compensation waveform that is shown in a solid line of FIG. 28 can be generated.

Figure 29:
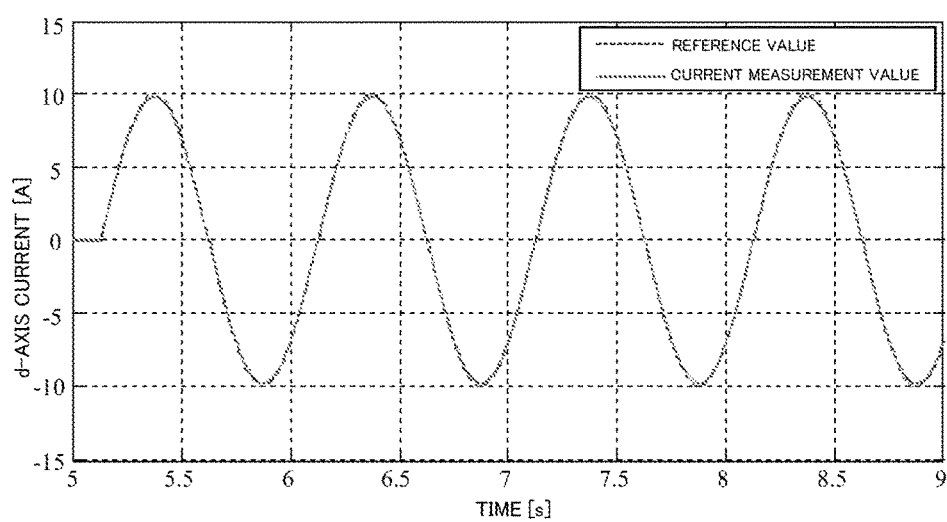
FIG. 29 is a waveform chart showing a characteristic example (a reference value and a current measurement value) of the current control (third harmonic superimposition and the dead time compensation) of the present invention.
Figure 30:
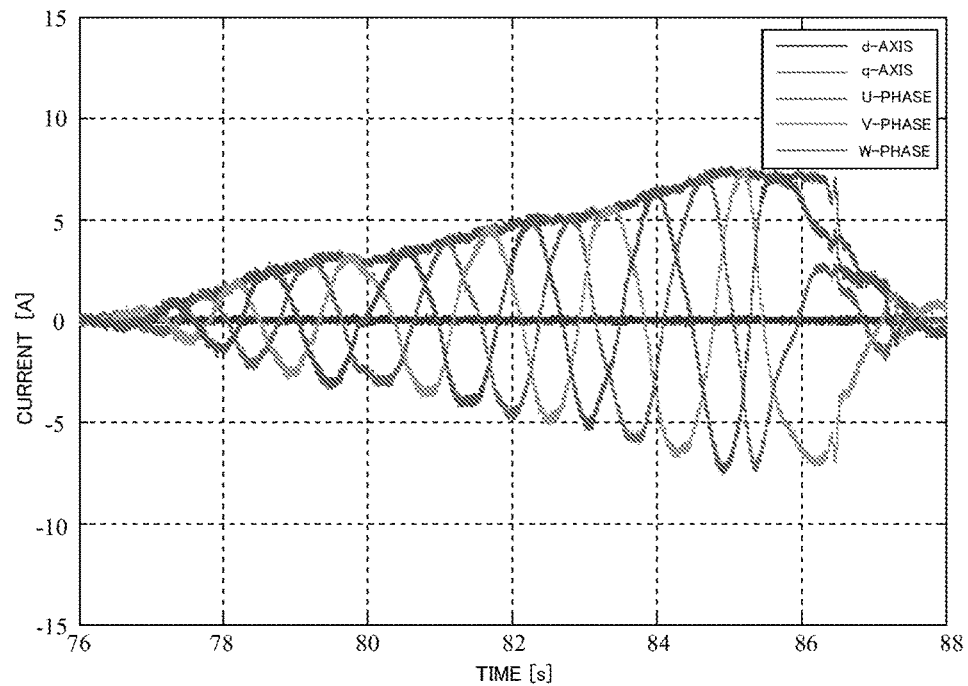
FIG. 30 is a waveform chart showing a current characteristic example (the dq-axes and the three phase) when a handle is slowly steered from an on-center.
Figure 31:
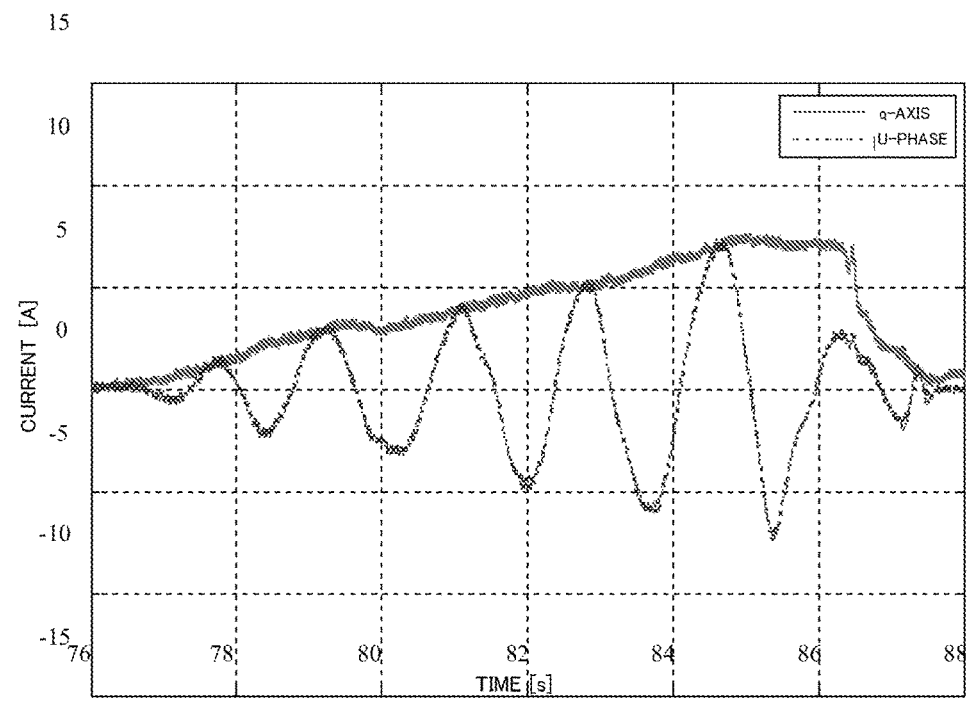
FIG. 31 is a waveform chart showing only the q-axis current and the U-phase current from the waveform diagram of FIG. 30.

In a case that the dq-axes disturbance observer and the spatial vector modulation (the third-harmonic superimposition and the dead time compensation) are operated, FIG. 29 is a result when the sinusoidal wave is inputted into the d-axis current command value. In comparison with the case that the dq-axes disturbance observer is not existed, the waveform distortions of the d-axis current value and the 3-phase current values are reduced, and the error is not almost generated. Showing the motor current when the handle is slowly steered from a straight running state (an on-center state), as show in FIG. 30 and FIG. 31, it is understood that the distortions of the phase currents are improved, and the vibration and the ripple of the q-axis current (the torque) are reduced.

By implementing an automatic model identification algorithm of the motor and changing a motor reference model of the dq-axes disturbance observer, plural kinds of the motors can be operated by the same control. The motor reference model of the dq-axes disturbance observer and the parameters of the 2-degree-of-freedom are changeable depending on the motor current. The current of the motor increases, and then the inductance $L_q$ of the motor is changed due to the magnetic saturation phenomena. In the above cases, the inductance nominal value $L_{qn}$ by the disturbance observer is treated as a fixed value. However, when the inductance nominal value $L_{qn}$ of the observer is not changed corresponding to the inductance of the motor, the waveform is distorted and the ripple is generated. In this connection, if the inductance nominal value $L_{qn}$ of the observer is changeable depending on the motor current, the distortion of the waveform and the ripple can be improved.

The limit value of the compensation value of the dq-axes disturbance observer in the motor current control is changeable depending on the power supply voltage of the inverter. Since the disturbance observer compensates all of the disturbances such as the back-EMF and the dead time, the region that is overcompensated is existed. For example, since the back-EMF is high in a case of the electric power steering apparatus, the overcompensation of the disturbance observer increases, the duty is saturated, and the noise and the vibration are generated. In a case that the power supply voltage of the inverter is high, since it is difficult to saturate the duty, the limit value after the compensation can be larger. However, in a case that the power supply voltage of the inverter is low, it is necessary that the limit value is small.

EXPLANATION OF REFERENCE NUMERALS 1 handle (steering wheel)
2 column shaft (steering shaft, handle shaft)
10 torque sensor
12 vehicle speed sensor
13 battery
20, 100 motor
30 control unit (ECU)
31 current command value calculating section
35, 203, 204 PI-control section
36, 160 PWM-control section
37, 161 inverter
110 angle detecting section
130 3-phase/2-phase converting section
140 d-q non-interference control section
200 2-degree-of-freedom control section
210 dq-axes disturbance observer
220, 220A spatial vector modulating section
221 2-phase/3-phase converting section
222 third-harmonic superimposition section

The invention claimed is:
1. An electric power steering apparatus that driving-controls a 3-phase brushless motor which applies an assist torque to a steering mechanism of a vehicle by using a current command value calculated based on at least a steering torque, and vector-controls said 3-phase brushless motor, via an inverter, by converting dq-axes command values converted from said current command value into 3-phase values, comprising:
  a dq-axes disturbance observer to compensate respective axes disturbance voltages, which include a dead time of said inverter, for said dq-axes command values,
  wherein said dq-axes disturbance observer comprises axes observer sections that each of a d-axis and a q-axis includes a motor model, an inverse motor model and a low pass filter, and
  wherein each of said axes observer sections comprises:
  a first subtracting section to subtract an axis disturbance estimation voltage from an axis voltage;
  said motor model to input an axis voltage command value that adds an axis disturbance element to a voltage deviation from said first subtracting section, and output an axis current;
  said inverse motor model to input said axis current;
  said low pass filter to input said voltage deviation; and a second subtracting section to subtract an output of said low pass filter from an output of said inverse motor model, and output said axis disturbance estimation voltage.

2. The electric power steering apparatus according to claim 1, wherein a compensation value of said dq-axes disturbance observer is changeable depending on a power supply voltage of said inverter.

3. The electric power steering apparatus according to claim 1, wherein an inductance nominal value of said dq-axes disturbance observer is changeable, sensitive to currents of said 3-phase brushless motor.

4. The electric power steering apparatus according to claim 1, wherein a first spatial vector modulating section to superimpose a third harmonic is disposed at a subsequent stage of said dq-axes disturbance observer.

5. The electric power steering apparatus according to claim 1,
wherein a second spatial vector modulating section to input 3-phase motor currents of said 3-phase brushless motor, convert compensated dq-axes voltage command values from said dq-axes disturbance observer into 3-phase values, superimpose a third harmonic and compensate a dead time of said inverter, is disposed at a subsequent stage of said dq-axes disturbance observer.

6. The electric power steering apparatus according to claim 5,
wherein said second spatial vector modulating section comprises:
a 2-phase/3-phase converting section to convert said compensated dq-axes voltage command values into 3-phase values;
a third-harmonic superimposition section to superimpose a third harmonic on 3-phase converted voltages, which are outputted from said 2-phase/3-phase converting section, and output harmonic superimposition voltages;
a dead time compensating section to output compensated dead time voltages in which said dead time is compensated based on said 3-phase converted voltages and said 3-phase motor currents; and
an adding section to add said compensated dead time voltages to said harmonic superimposition voltages, and output said added voltages as 3-phase driving voltage command values.

7. The electric power steering apparatus according to claim 5, wherein said dq-axes disturbance observer comprises axes observer sections that each of a d-axis and a q-axis includes a motor model, an inverse motor model and a low pass filter.

8. The electric power steering apparatus according to claim 6, wherein said dq-axes disturbance observer comprises axes observer sections that each of a d-axis and a q-axis includes a motor model, an inverse motor model and a low pass filter.

9. The electric power steering apparatus according to claim 7,
wherein each of said axes observer sections comprises:
a first subtracting section to subtract an axis disturbance estimation voltage from an axis voltage;
said motor model to input an axis voltage command value that adds an axis disturbance element to a voltage deviation from said first subtracting section, and output an axis current;
said inverse motor model to input said axis current;
said low pass filter to input said voltage deviation; and
a second subtracting section to subtract an output of said low pass filter from an output of said inverse motor model, and output said axis disturbance estimation voltage.

10. The electric power steering apparatus according to claim 8,
wherein each of said axes observer sections comprises:
a first subtracting section to subtract an axis disturbance estimation voltage from an axis voltage;
said motor model to input an axis voltage command value that adds an axis disturbance element to a voltage deviation from said first subtracting section, and output an axis current;
said inverse motor model to input said axis current;
said low pass filter to input said voltage deviation; and
a second subtracting section to subtract an output of said low pass filter from an output of said inverse motor model, and output said axis disturbance estimation voltage.

11. The electric power steering apparatus according to claim 5, wherein a compensation value of said dq-axes disturbance observer is changeable depending on a power supply voltage of said inverter.

12. The electric power steering apparatus according to claim 6, wherein an inductance nominal value of said dq-axes disturbance observer is changeable, sensitive to currents of said 3-phase brushless motor.

* * * * *